US008752952B2

(12) United States Patent  (10) Patent No.: US 8,752,952 B2
Mizutaki et al.  (45) Date of Patent: Jun. 17, 2014

(54) RECORDING METHOD, LIGHT CURABLE TYPE INK SET, AND RECORDING APPARATUS

(75) Inventors: Yusuke Mizutaki, Shiojiri (JP); Mitsuaki Yoshizawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 13/303,545

(22) Filed: Nov. 23, 2011

(65) Prior Publication Data

US 2012/0127249 A1    May 24, 2012

(30) Foreign Application Priority Data

Nov. 24, 2010 (JP) ................................. 2010-260936
Sep. 20, 2011 (JP) ................................. 2011-204287

(51) Int. Cl.
*B41J 2/01* (2006.01)

(52) U.S. Cl.
USPC .............. 347/102; 347/100; 347/101; 347/96

(58) Field of Classification Search
USPC ........... 347/100, 102, 101, 95, 96, 88, 99, 21, 347/20, 9; 106/31.6, 31.13, 31.27; 523/160, 523/161
See application file for complete search history.

(56) References Cited

U.S. PATENT DOCUMENTS

| | | | | |
|---|---|---|---|---|
| 5,562,951 A | * | 10/1996 | Kamen | 427/493 |
| 7,168,802 B2 | * | 1/2007 | Kondo | 347/100 |
| 7,279,506 B2 | * | 10/2007 | Sisler et al. | 106/31.13 |
| 7,553,605 B2 | | 6/2009 | Hayata et al. | |
| 7,815,303 B2 | * | 10/2010 | Kasai | 347/102 |
| 2003/0222961 A1 | * | 12/2003 | Nakajima | 347/102 |
| 2004/0252173 A1 | * | 12/2004 | Ben-Zur et al. | 347/101 |
| 2005/0093952 A1 | * | 5/2005 | Hoshino | 347/102 |
| 2005/0190248 A1 | * | 9/2005 | Konno et al. | 347/102 |
| 2006/0158481 A1 | * | 7/2006 | Spevak et al. | 347/43 |
| 2006/0187285 A1 | | 8/2006 | Oyanagi et al. | |
| 2006/0227194 A1 | * | 10/2006 | Hoshino | 347/102 |
| 2008/0180503 A1 | * | 7/2008 | Umebayashi | 347/102 |
| 2009/0227733 A1 | | 9/2009 | Miura | |

FOREIGN PATENT DOCUMENTS

| | | |
|---|---|---|
| JP | 2003-341021 A | 12/2003 |
| JP | 2006123542 A | 5/2006 |
| JP | 2006137183 A | 6/2006 |
| JP | 2006-289722 A | 10/2006 |
| JP | 2008-075062 A | 4/2008 |
| JP | 2009-138150 A | 6/2009 |
| JP | 2009-235380 A | 10/2009 |
| JP | 2009-285854 A | 12/2009 |

* cited by examiner

*Primary Examiner* — Manish S Shah
(74) *Attorney, Agent, or Firm* — Nutter McClennen & Fish LLP; John J. Penny, V.

(57) ABSTRACT

Provided is a recording method using a light-curable-type ink set including a light-curable-type color-ink composition containing a polymerizable compound, a photopolymerization initiator, and a coloring material and a light-curable-type clear-ink composition containing a polymerizable compound and a photopolymerization initiator, wherein the light-curable-type color-ink composition contains (1) an acylphosphine oxide-based photopolymerization initiator and (2) at least one of a thioxanthone-based photopolymerization initiator and/or an α aminoalkylphenone-based photopolymerization initiator which is in a range of 0.5 to 4 mass % with respect to the total mass of the color ink composition, wherein the light-curable-type clear-ink composition contains an acylphosphine oxide-based photopolymerization initiator which is in a range of 5 to 12 mass % with respect to the total mass of the clear-ink composition, and wherein illumination energy when a coated film made from the ink set is cured through light illumination from a light source is in a range of 100 to 800 mJ/cm$^2$.

20 Claims, 3 Drawing Sheets

UPSTREAM ⟶ DOWNSTREAM
TRANSPORT DIRECTION

RECORDING METHOD, LIGHT CURABLE TYPE INK SET, AND RECORDING APPARATUS

BACKGROUND

1. Technical Field

The present invention relates to a recording method, a light curable type ink set used therefor, and a recording apparatus.

2. Related Art

In the related art, in order to improve appearance of portrait pictures or the like, particularly ink having excellent curability and esthetics has been necessarily used, and various considerations have been made.

For example, JP-A-2009-285854 discloses a single pass type ink jet recording apparatus which ejects first ink and, after that, temporarily-cures the first ink before ejecting second ink.

In addition, JP-A-2009-138150 disclose a light curing method of curing a water-based photopolymerization composition containing an alkyl phenone-based photoinitiator or a benzyl ketal-based photoinitiator where a plurality of alkyl radicals are introduced into a phenyl radical to make a carbonic acid or a sulfonic acid to be pendent by using a light-emitting diode having a main wavelength of 320 nm to 380 nm.

However, if the inks disclosed in JP-A-2009-285854 or JP-A-2009-138150 described above are used, there is a problem in that curability (an LED tack-free property) or esthetics (a color stability of the ink and a transparency of the clear ink) deteriorates. Therefore, a light curable type ink composition for forming a coated film having excellent curability and esthetics is still necessarily used.

SUMMARY

An advantage of some aspects of the invention is to provide a recording method and a light curable type ink set used for the recording method, of which an LED tack-free property, a color stability of ink, and a transparency of clear ink are excellent and of which the color stability of ink and the transparency of clear ink are particularly excellent.

The inventors have researched intensively in order to solve the problem described above. As a result, it was found that, in a recording method where illumination energy during the time when the main curing of a coated film made from the ink set by using a light curable type ink set including a light curable type color ink composition having a predetermined composition and a light curable type clear ink composition having a predetermined composition is performed through light illumination is in a predetermined range, the LED tack-free property, the color stability of ink, and the transparency of clear ink become excellent and the quality of an image (image quality) is also excellent, and thus, the invention has been achieved.

In other words, the invention is as follows.

[1] A recording method using a light curable type ink set including a light curable type color ink composition containing a polymerizable compound, a photopolymerization initiator, and a coloring material and a light curable type clear ink composition containing a polymerizable compound and a photopolymerization initiator, wherein the light curable type color ink composition contains (1) an acylphosphine oxide-based photopolymerization initiator and (2) at least one of a thioxanthone-based photopolymerization initiator and/or an α amino alkyl phenone-based photopolymerization initiator which is in a range of 0.5 to 4 mass % with respect to the total mass of the color ink composition, wherein the light curable type clear ink composition contains an acylphosphine oxide-based photopolymerization initiator which is in a range of 5 to 12 mass % with respect to the total mass of the clear ink composition, and wherein illumination energy at the time when a coated film made from the ink set is cured through light illumination from a light source is in a range of 100 to 800 $mJ/cm^2$.

[2] The recording method according to [1], wherein a first coated film of the light curable type color ink composition is formed on the recording medium, and a second coated film of the light curable type clear ink composition is formed on the first coated film.

[3] The recording method according to [1] or [2], wherein the light curable type color ink composition is a thioxanthone-based photopolymerization initiator which is in a range of 1 to 4 mass % with respect to the total mass of the color ink composition.

[4] The recording method according to any one of [1] to [3], wherein the light source is a mercury lamp or a metal halide lamp.

[5] The recording method according to any one of [1] to [4], wherein the light curable type clear ink composition is illuminated with the light from the temporary curing light source before the light illumination of the illumination energy from the light source.

[6] The recording method according to [5], wherein the temporary curing light source is a light-emitting diode.

[7] The recording method according to any one of [1] to [6], wherein while the recording medium is relatively scanned with respect to a print head, the light curable type ink set is ejected from the print head and landed on the recording medium to form the coated film, and the coated film is cured through the light illumination, so that the image is formed, wherein the recording method includes: forming a first coated film on the recording medium by allowing a light curable type color ink composition to be ejected and landed on the recording medium; performing temporary curing of the first coated film by first light illumination; forming a second coated film on at least any one of the recording medium and some or all of the first coated film by allowing a light curable type clear ink composition to be ejected on at least any one of the recording medium and some or all of the first coated film; performing temporary curing of the second coated film by second light illumination; and performing main curing of the temporarily-cured first and second coated films by light illumination from a light source.

[8] The recording method according to [7], wherein a conversion ratio in the performing of the temporary curing of the first coated film by the first light illumination is in a range of 30 to 95%.

[9] The recording method according to [7] or [8], wherein a conversion ratio in the performing of the temporary curing of the second coated film by the second light illumination is in a range of 30 to 100%.

[10] The recording method according to any one of [1] to [3], wherein the light source is a light-emitting diode.

[11] The recording method according to any one of [1] to [3], wherein recording is performed by using a line ink jet printer.

[12] The recording method according to any one of [1] to [3], wherein recording is performed by using a serial ink jet printer.

[13] The recording method according to [12], wherein illumination by the main scanning and illumination by main scanning after the main scanning are performed on the ink attached on the recording medium by the main scanning.

[14] The recording method according to [12] or [13], wherein illumination energy for a cyan ink composition and illumination energy for a clear ink composition are different from each other.

[15] A light curable type ink set including the light curable type color ink composition and the light curable type clear ink composition used in the recording method according to any one of [1] to [14].

[16] A recording apparatus performing recording by using the recording method according to any one of [1] to [14].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
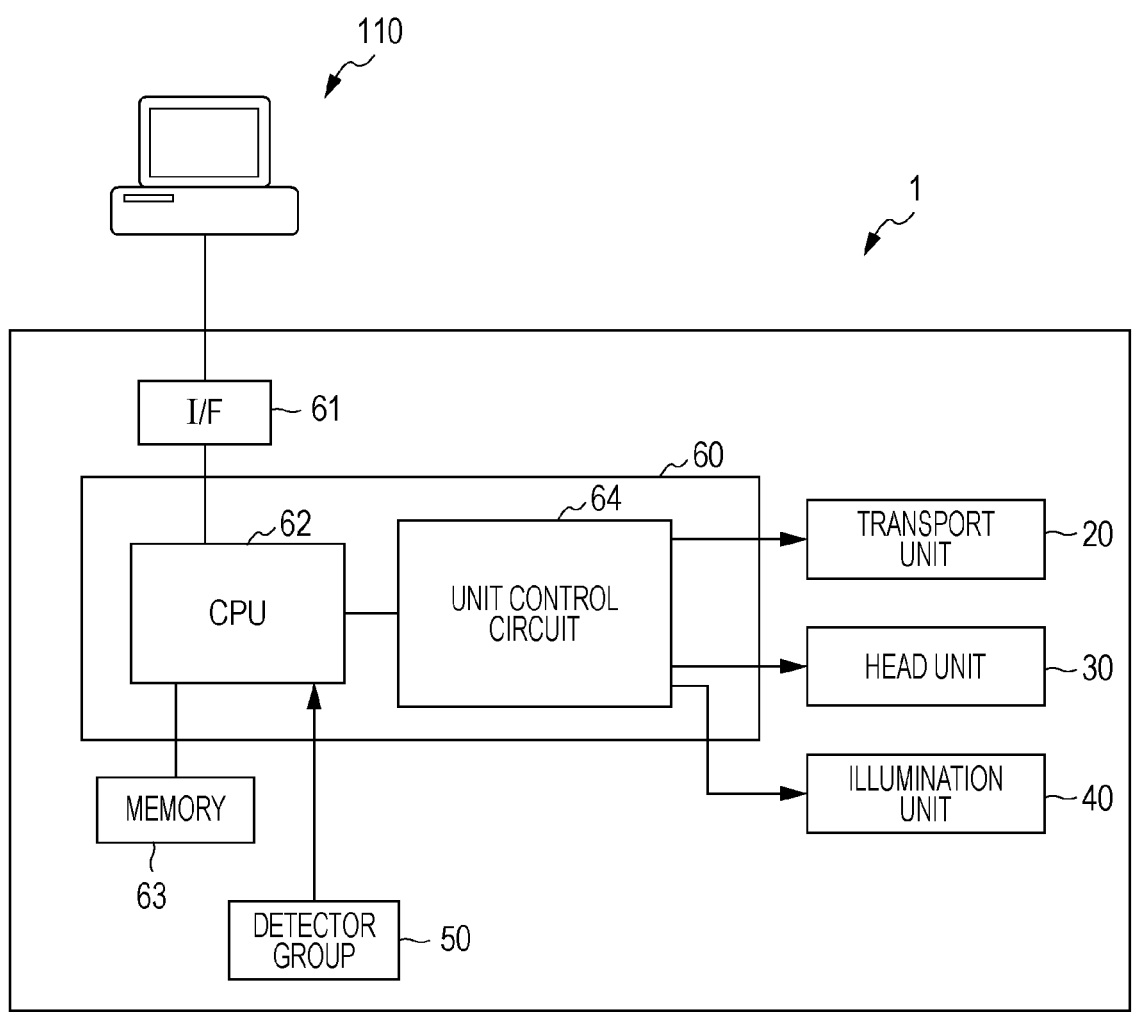
FIG. 1 is a block diagram illustrating a configuration of a line printer used for an embodiment of the invention.

Hereinafter, embodiments of the invention will be described in detail. In addition, the invention is not limited to the embodiments described hereinafter, and various modifications may be embodied within the scope of the invention.

In this specification, "tack-free property" denotes that no scratch mark is formed even by a cotton swab. More specifically, the tack-free property denotes a property which is evaluated by a time taken from the time when a surface (cured film) of a recording material is touched with a finger to the time when the finger is not attached to the film due to viscosity (tack) of the surface of the film, and the time is referred to as a tack-free time or a finger contact drying time. A good tack-free property denotes that the time is shorter. An "LED tack-free property" denotes a tack-free property after the temporary curing performed by using a light-emitting diode (LED). "Color stability" denotes a property where, as seen in a time sequence after printing, L*a*b* in CIE Lab (L*a*b* colorimetric system) is barely changed from L*a*b* just after the printing. "Transparency" denotes a property where discoloration such as yellowish discoloration or bluish discoloration in a cured film is not visually recognized. "Curability" denotes a property where polymerization curing is completed through light illumination in the presence or absence of a photopolymerization initiator. "Ejection stability" denotes a property where ink droplets are always stably ejected from nozzles without clogging of the nozzles.

In addition, in this specification, "color ink" is ink used for coloring a recording medium and indicates all color ink. "Clear ink" is not ink used for coloring the recording medium but ink used for providing a glossiness or the like to the recording medium and, in general, is colorless transparent ink or almost colorless transparent ink. "Conversion ratio" denotes a ratio of a polymerizable compound converted into a cured material to a polymerizable compound contained in an ink composition and may be restated as a degree of curing of an ink composition through light illumination. "Temporary curing" denotes temporary fastening (pinning) of ink. The temporary curing is curing performed before main curing in order to prevent bleeding or color mixing of dots. In general, a conversion ratio in the temporary curing is lower than the conversion ratio in the main curing performed after the temporary curing. "Main curing" denotes curing performed until the dots formed on the recording medium come to be in a cured state necessary to be used as a printing material.

In addition, a "main curing light source" denotes a light source used for the main curing, and a "temporary curing light source" denotes a light source used for the temporary curing.

In addition, in this specification, a "duty" is a value calculated by the following equation and is restated as a printing duty or a printing ratio.

$$\text{Duty}(\%)=(\text{Number of Actually Printed Dots})/((\text{Vertical Resolution})\times(\text{Horizontal Resolution}))\times 100$$

(In this equation, the "number of actually printed dots" is the number of actually printed dots per unit area, and the "vertical resolution" and the "horizontal resolution" are resolutions per unit area. In addition, the "duty 100%" denotes a maximum ink mass of mono color per unit pixel).

In addition, in this specification, "(meth)acrylate" denotes at least one of acrylate and the corresponding methacrylate, and "(meth)acryl" denotes at least one of acryl and the corresponding methacryl.

Recording Method

An embodiment of the invention relates to a recording method. In the recording method, a light curable type ink set (hereinafter, referred to as a "specific light curable type ink set") including a light curable type color ink composition having a predetermined composition and a light curable type clear ink composition having a predetermined composition is used, and an illumination energy of the main curing through the light illumination on a coated film made from the ink set is in a range of 200 to 800 mJ/cm$^2$.

Recording Apparatus

Hereinafter, a recording apparatus used for the recording method according to the embodiment will be described in detail.

Figure 2:
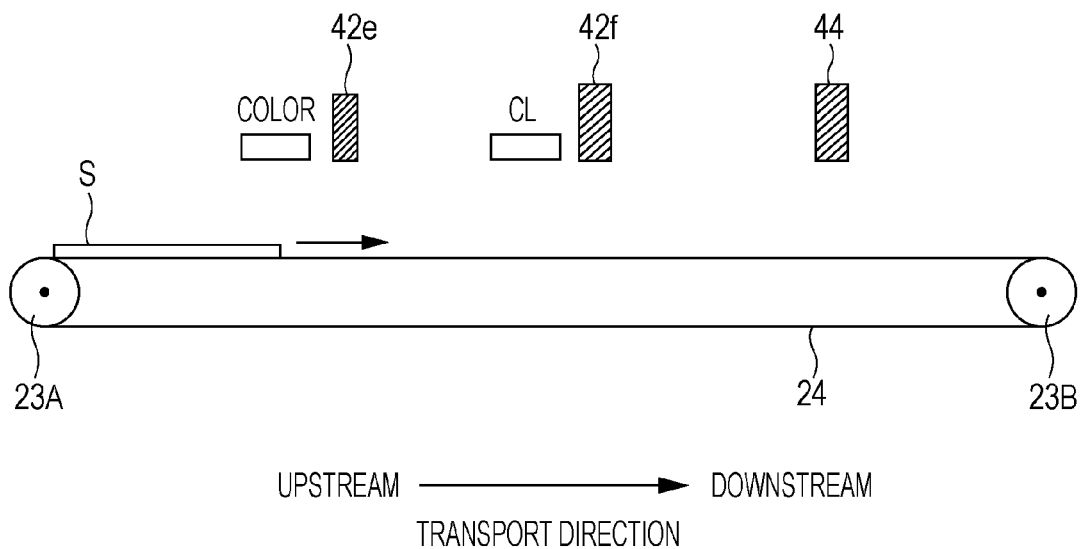
FIG. 2 is a schematic diagram illustrating a peripheral portion of a recording area in one type of the line printer of FIG. 1.

FIG. 1 is a block diagram illustrating a configuration of a line printer which is an example of the recording apparatus used in the embodiment. FIG. 2 is a schematic diagram illustrating a peripheral portion of a recording area in one type of the line printer of FIG. 1.

1. Configuration of Apparatus

As illustrated in FIG. 1, a printer 1 according to the embodiment is communicatably connected to a computer 110 which is an external apparatus.

The printer 1 is an apparatus which forms an image on the recording medium by ejecting the light curable type ink composition which is to be cured through the illumination of radioactive rays (light).

Herein, in the specification, the phrase "on the recording medium" denotes "on a surface of the recording medium" and "above the surface".

The printer 1 (recording apparatus) includes a transport unit 20 (transport unit) which transports a recording medium in a transport direction; a portion (first print head) of a head unit 30 which ejects a light curable type color ink composition on the recording medium; a portion (first temporary curing illumination unit) of an illumination unit 40 which temporarily-cures a first coated film made from the color ink composition landed on the recording medium through first light illumination; a portion (second print head) of the head unit 30 which is disposed at a transport direction downstream side from the first temporary curing illumination unit and ejects the light curable type clear ink composition on at least a portion of the first coated film; a portion (second temporary curing illumination unit) of the illumination unit 40 which temporarily-cures a second coated film made from a clear ink composition landed on the temporarily-cured first coated film and at least the portion of the first coated film through second light illumination; and a portion (main curing illumination unit) of the illumination unit 40 which mainly-cures the temporarily-cured first coated film and the temporarily-cured second coated film through light illumination from a main curing light source. In addition, the printer 1 (recording apparatus) arbitrarily includes a detector group 50 and a controller 60. In addition, the first light illumination and the second light illumination denote light illumination from a temporary curing light source.

The transport unit 20 is configured to transport the recording medium in the transport direction. As illustrated in FIG. 2, the transport unit 20 includes, for example, an upstream side transport roller 23A, a downstream side transport roller 23B, and a belt 24.

The head unit 30 is configured to eject a light curable type ink composition on the recording medium.

The illumination unit 40 is configured to illuminate dots of the light curable type ink composition landed on the recording medium S with light. The illumination unit 40 according to the embodiment preferably includes a first temporary curing illumination unit 42e, a second temporary curing illumination unit 42f, and a main curing illumination unit 44 as an aspect illustrated later in FIG. 2 in order to prevent bleeding and to prevent color mixing.

If necessary, the detector group 50 includes a rotary type encoder (not shown), a paper detection sensor (not shown), and the like.

The controller 60 is a control unit for performing control of the printer. The controller 60 includes an interface unit 61, a CPU 62, a memory 63, and a unit control circuit 64. The interface unit 61 is configured to perform data transmission and reception between the computer 110 which is an external apparatus and the printer 1. The CPU 62 is a calculation processing unit for performing overall control of the printer. The memory 63 is configured to secure an area of storing the program of the CPU 62, a work area, and the like and includes a storage device such as a RAM, and an EEPROM. The unit control circuit 64 is configured to control units (components) based on the control of the CPU 62 according to the program stored in the memory 63.

As described above, the printer 1 is configured to form an image (perform printing) by using at least a light curable type color ink composition (hereinafter, simply referred to as a "color ink composition") which is ejected first and a light curable type clear ink composition (hereinafter, simply referred to as a "clear ink composition") which is ejected later.

FIG. 2 is a schematic diagram illustrating a configuration relating to printing of the printer 1. FIG. 2 exemplarily illustrates an aspect where the color ink composition is individually one composition or a combination of two or more compositions. In the aspect of FIG. 2, in the case where the color ink composition is a combination of two or more compositions, the print heads (not shown) (hereinafter, simply referred to as "heads") for the color ink compositions of the colors are configured to be sequentially arranged at the position of the head COLOR of FIG. 2 from the upstream side to the downstream side in the transport direction. As a specific example, the heads of a black ink head, a cyan ink head, a magenta ink head, and a yellow ink head are sequentially installed at the position of the head COLOR of FIG. 2 from the upstream side. Next, as illustrated in FIG. 2, the color head COLOR and the clear ink head CL are installed in this order from the transport direction upstream side.

In the aspect illustrated in FIG. 2, the first temporary curing illumination unit 42e is installed at the transport direction downstream side of the head COLOR. In addition, besides the first temporary curing illumination unit 42e, the second temporary curing illumination unit 42f is installed at the transport direction downstream side of the clear ink head CL. In addition, the main curing illumination unit 44 is installed at the transport direction downstream side of the second temporary curing illumination unit 42f.

2. Operation of Apparatus

The printer 1 which receives printing data from the computer 110 which is an external apparatus controls units (components), that is, the transport unit 20, the head unit 30, and the illumination unit 40 by the controller 60 and forms an image on the recording medium according to the printing data. The controller 60 controls the components based on the printing data received from the computer 110 and forms the image on the recording medium. The situation of the printer 1 is detected by the detector group 50, and the detector group 50 outputs a detection result to the controller 60. The controller 60 controls the components based on the detection result output from the detector group 50.

In the transport unit 20, if a transport motor (not shown) is rotated, the upstream side transport roller 23A and the downstream side transport roller 23B illustrated in FIG. 2 are rotated, so that the belt 24 is moved. The recording medium S fed by a feed roller (not shown) is transported to a recordable area (area facing the head) by the belt 24. Next, the recording medium S passing through this area is discharged to an external portion by the belt 24.

At this time, while the transport unit 20 (scanning unit) allows the recording medium S to be scanned in the transport direction (scan direction) relatively with respect to the head unit 30 (head), the transport unit 20 ejects the ink (the later-described light curable type ink set) from the head unit 30. The ink ejection may be performed by performing scanning of allowing the head unit 30 to be moved with respect to the recording medium S instead of transporting the recording medium S. Herein, in the case of performing the scanning of allowing the recording medium S to be moved with respect to the head unit 30, the side to which the recording medium S is transported is the downstream side; and in the case of performing the scanning of allowing the head unit 30 to be moved with respect to the recording medium S, the side to which the head unit 30 is moved is the upstream side.

In addition, the recording medium S which is being transported may be electrostatically suctioned or vacuum-suctioned on the belt 24. In addition, in the specification, for the convenience of description, although the phrase "to feed a sheet" is used, the later-described recording medium may be used as the recording medium S according to the embodiment.

The head unit 30 ejects at least the color ink composition and the clear ink composition as the light curable type ink composition for forming an image.

The head unit 30 forms dots (lands ink) on the recording medium S by ejecting each ink on the recording medium S which is being transported to form a coated film, so that an image is formed. The printer 1 is a line printer, and each of the heads of the head unit 30 may from the dots corresponding to a width of the recording medium.

In the illumination unit 40, the dots (landed ink) formed on the recording medium S is cured through the light illumination from the illumination unit 40.

The first temporary curing illumination unit 42e illustrated in FIG. 2 performs the first light illumination for temporary curing of the dots corresponding to the first coated film formed on the recording medium S before the clear ink composition is landed thereon. In the first temporary curing illumination unit, since the temporary curing may be performed, at least a portion of the dots (liquid droplets), for example, a surface of the dots may be cured. The temporary curing is performed, so that it is possible to prevent bleeding of ink.

In addition, the second temporary curing illumination unit 42f illustrated in FIG. 2 speedily performs temporary curing by performing the second light illumination on the clear ink so as to securely prevent the bleeding of the color ink and the clear ink. In addition, in FIG. 2, instead of installing the second temporary curing illumination unit 42f, only the main curing illumination unit 44 may perform light illumination on the clear ink.

The main curing illumination unit 44 illustrated in FIG. 2 performs main curing of the color ink composition and the clear ink composition which are landed on the recording medium through the light illumination from the main curing light source. In other words, the main curing illumination unit 44 performs the light illumination so as to almost completely cure (main curing) the dots (the first coated film and the second coated film of the clear ink composition) formed on the recording medium S. In addition, a length of the main curing illumination unit 44 in the width direction of the recording medium S is equal to or larger than a width of the recording medium S. Next, the main curing illumination unit 44 illuminates dots formed by the heads of the head unit 30 with light.

The main curing illumination unit 44 includes an LED or a lamp as the main curing light source. The lamp is not particularly limited and may include, for example, a chemical lamp such as a metal halide lamp, a xenon lamp, and a carbon arc lamp, a low pressure mercury lamp, and a high pressure mercury lamp.

Each of The first temporary curing illumination unit 42e and the second temporary curing illumination unit 42f includes a light-emitting diode (LED) as a temporary curing light source. The illumination energy of the LED may be easily changed by controlling a magnitude of an input current.

In the case where the main curing is performed once, the light illumination energy for the main curing by the main curing illumination unit 44 is common between the light curable type color ink composition and the light curable type clear ink composition. On the other hand, in order to allow the light illumination energy for the main curing to be different between the light curable type color ink composition and the light curable type clear ink composition, after each ink composition is landed on the recording medium, the main curing is necessarily performed each time. However, in the case where the main curing is performed two or more times, the configuration thereof is complicated, and the processes of the recording method are complicated. Therefore, it is preferable that the main curing be performed once. Accordingly, in order to perform the main curing once, it is preferable that the light curable type color ink composition and the light curable type clear ink composition are used as a set.

In addition, in this specification, the illumination energy illuminated from the light source during the temporary curing (pinning) period is distinguished from the illumination energy during the main curing period in that the wavelength thereof is different from (much shorter than) that of the main curing period.

The illumination energy during the main curing period, that is, the illumination energy at the time when the coated film made from a light curable type ink set described later is cured through the light illumination from the main curing light source is in a range of 100 to 800 $mJ/cm^2$, preferably in a range of 200 to 800 $mJ/cm^2$, more preferably in a range of 250 to 750 $mJ/cm^2$, particularly preferably in a range of 300 to 700 $mJ/cm^2$. Details of the illumination energy will be described later.

As illustrated in FIG. 2, the printer 1 further includes a second temporary curing illumination unit 42f between the clear ink head CL and the main curing illumination unit 44, so that it is possible to effectively prevent bleeding (color mixing) between the color ink and the clear ink.

The rotary type encoder included in the detector group 50 detects the rotation amount of the upstream side transport roller 23A the downstream side transport roller 23B. The transport amount of the recording medium S may be detected based on the detection result of the rotary type encoder. In addition, the paper detection sensor included in the detector group 50 detects the position of the front end of the recording medium S during the feeding thereof.

In addition, operations of the components constituting the controller 60 are the same as described above.

The computer 110 allows a printer driver to be installed therein. The printer driver is a program for allowing a user interface to be displayed on a display apparatus (not shown) and converting image data output from an application program into printing data (image forming data). The printer driver is recorded on a computer-readable recording medium such a flexible disk FD or a CD-ROM. Otherwise, the printer driver may also be downloaded to the computer 110 through the Internet. In addition, the program is configured with codes for implementing various functions.

Next, the computer 110 outputs printing data according to an image to the printer 1 in order to allow the printer 1 to form the image.

In addition, the printer (recording apparatus) according to the embodiment described above may include a serial printer described later besides the line printer such as the printer 1. These are different from each other in terms of a type of a printer. In brief, the line printer performs printing with the head being not moved but fixed. On the other hand, the serial printer performs printing with the head being reciprocally moved (performing shuttle movement) in the direction intersecting the transport direction of the recording medium.

From among such, in the line printer, when the head is allowed to be scanned once in a predetermined direction with respect to the recording medium (single pass), an image is formed. In the case where the recording medium is transported in the predetermined transport direction, the head is relatively scanned in the opposite direction of the transport direction. In other words, in the line printer, during the recording period, the recording medium passes through the lower portion of the head only one time. In generally, this printing is referred to as single pass printing.

3. Modified Example

In the case where two or more color ink compositions are to be ejected, the head unit 30 is not limited to the aspect described with reference to FIG. 2. For example, the head unit 30 may also have a configuration where a plurality of the heads which eject different color ink compositions are sequentially arranged in the transport direction. In this modified example, the heads of the color ink compositions may be disposed to be in contact with each other and adjacent to each other. In addition, the heads may be disposed to be separated from each other by an interval.

In addition, in the case where the heads of the color ink compositions are disposed to be separated from each other by an interval, the first temporary curing illumination units may be installed between the heads. In other words, in the illumination unit 40, the heads of the color ink compositions and the first temporary curing illumination unit may be alternately installed. In other words, the first temporary curing illumination unit is installed at each of the transport direction downstream sides of the heads of the ink colors.

In the aspect of FIG. 2 and the above-described modified example, the printer 1 is a line printer, and each of the heads of the head unit 30 may form the dots corresponding to a width of the recording medium once.

On the other hand, the recording method according to the invention may be performed by a serial printer. In this case, for example, as disclosed in JP-A-2003-341021, the ejection and temporary curing of the ink composition may be performed by a head and a temporary curing light source which are installed in a carriage, and after that, the main curing may be performed by a main curing light source which is installed at the transport direction downstream side from the carriage.

Process of Recording Method

Hereinafter, processes of the recording method according to the embodiment will be described in detail.

Figure 3:
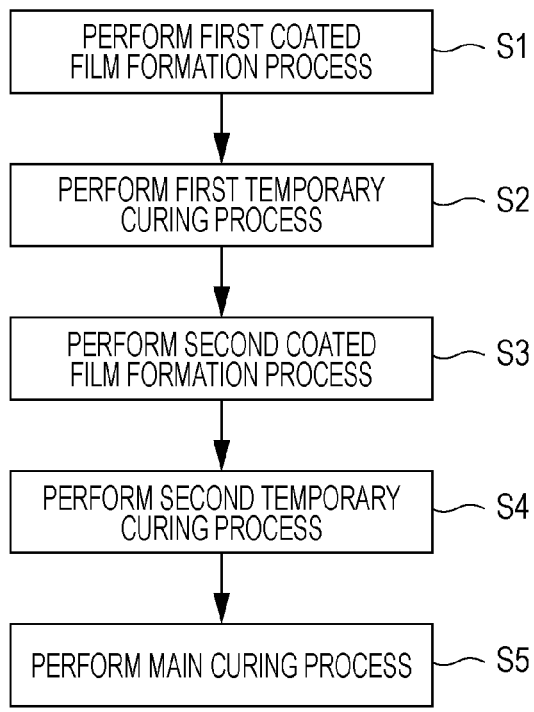
FIG. 3 is a flowchart illustrating a recording method which is an embodiment of the invention.

The recording method is performed by using a recording apparatus. In the recording method, while the recording medium is transported in the transport direction, the light curable type ink composition is landed on the recording medium to form the coated film (dots), and the coated film (dots) is cured through the light illumination, so that the image is formed. At this time, the recording method is performed by performing the following processes. FIG. 3 is a flowchart illustrating the recording method according to the embodiment.

As illustrated in FIG. 3, the processes described above include a first coated film formation process (S1), a first temporary curing process (S2), a second coated film formation process (S3), a second temporary curing process (S4), and a main curing process (S5). Hereinafter, each of the processes will be described in detail.

In addition, in the processes, the description of the corresponding portions of the recording apparatus will not be made.

First Coated Film Formation Process

In the first coated film formation process (S1), the first coated film is formed on the recording medium by allowing the light curable type color ink composition to be ejected and landed on the recording medium.

The first coated film formation process (S1) is performed by the head unit 30 of the printer 1 (recording apparatus). More specifically, the process is performed by the head disposed at the transport direction upstream side. The first coated film formation process (S1) is performed by the color ink head COLOR, for example, in the aspect illustrated in FIG. 2.

In addition, the liquid droplet mass of the color ink composition is not particularly limited, but it is preferably in a range of 1 ng to 20 ng. The resolution of the color ink composition is not particularly limited, but it is preferably in a range of 720 dpi×720 dpi to 1440 dpi×1440 dpi.

In addition, the film thickness of the color ink composition which is coated (printed) on the recording medium is preferably in a range of 5 to 10 μm in order to obtain good curability.

First Temporary Curing Process

In the first temporary curing process (S2), the first coated film is temporarily-cured through the first light illumination.

The first temporary curing process (S2) is performed by the first temporary curing illumination unit 42$e$ (FIG. 2) of the illumination unit 40 of the printer 1 (recording apparatus).

In the specification, as the conversion ratio, a value measured by Infrared (IR) absorption spectroscopy is used. In other words, if the double bond amount in the ink composition is measured by the IR spectroscopy, the double bond amount for the proceeding of the polymerization reaction is decreased as the conversion ratio is increased, so that the conversion ratio is expressed by the ratio of the decrease of the double bond.

In order to prevent the mixing of the color ink and the clear ink, the conversion ratio in the first temporary curing process (S2) is preferably equal to or more than 30%, more preferably equal to or more than 40%. On the other hand, with respect to the upper limit of the conversion ratio, although the first temporary curing process is configured so as to prevent the color mixing of the color ink and the clear ink, if the conversion ratio of the color ink is too high, when the clear ink is ejected on the cured color ink, repelling of the clear ink may occur. Therefore, it is preferable that the conversion ratio of the color ink by the temporary curing be equal to or less than 95%.

In the first temporary curing process (S2), a light-emitting diode (LED) may be used as the light source of the first light illumination. As described above, the illumination energy may be easily changed by controlling the magnitude of the input current of the LED.

The LED in the first temporary curing process (S2) has a peak wavelength which is preferably in a range of 350 nm to 450 nm, and more preferably in a range of 380 nm to 450 nm. If the LED has the peak wavelength in the range described above, it is possible to obtain an advantage of cost reduction.

The light illumination energy for the temporary curing is not limited, and it is changed according to the ink composition. However, the ultraviolet ray illumination energy is preferably equal to or less than 300 mJ/cm$^2$, more preferably in a range of 5 to 200 mJ/cm$^2$. If the ultraviolet ray illumination energy is within this range described above, bleeding is prevented. In addition, when the color ink after the illumination is further coated with ink, repelling of the coated ink is prevented.

Second Coated Film Formation Process

In the second coated film formation process (S3), the second coated film is formed on at least any one of the recording medium and some or all of the first coated film by ejecting and landing the light curable type clear ink composition on at least any one of the recording medium and some or all of the first coated film. In other words, in the case where the second coated film is formed on some or all of the first coated film, an image may be formed so that the color ink and the clear ink constituting the light curable type ink set (almost) overlap each other. In addition, in the case where the second coated film is formed on the recording medium, an image may be formed so that the color ink and the clear ink constituting the light curable type ink set do not overlap each other. In addition, in the case where the second coated film is formed on the recording medium and on some or all of the first coated film, an image having a pattern where the color ink and the clear ink constituting the light curable type ink set overlap each other and another pattern where the color ink and the clear ink do not overlap each other may be formed.

The second coated film formation process (S3) is performed by the head unit 30 of the printer 1 (recording apparatus). More specifically, in the aspect illustrated in FIG. 2, the process is performed by the clear ink head CL disposed at the transport direction downstream side.

Herein, the duty of the clear ink composition is not particularly limited.

In addition, the film thickness of the clear ink composition which is coated (printed) on the recording medium is preferably in a range of 3 to 15 μm in order to obtain good curability.

Second Temporary Curing Process

In the second temporary curing process (S4), the second coated film is temporarily-cured through the second light illumination. It is preferable that the clear ink composition is illuminated with the light from the temporary curing light source in the second temporary curing process before the light illumination of the illumination energy from the main curing light source in the later-described main curing process. Accordingly, it is possible to prevent the mixing (bleeding) of the color ink and the clear ink.

The second temporary curing process (S4) is performed by the second temporary curing illumination unit 42f (FIG. 2) of the illumination unit 40 of the printer 1 (recording apparatus).

In order to prevent the mixing of the color ink and the clear ink, the conversion ratio in the second temporary curing process (S4) is preferably equal to or more than 30%, and more preferably equal to or more than 40%.

In the second temporary curing process (S4), an LED may be preferably used as the light source of the second light illumination, that is, the temporary curing light source. As described above, the illumination energy may be easily changed by controlling the magnitude of the input current of the LED.

The LED in the second temporary curing process (S4) has a peak wavelength which is preferably in a range of 350 nm to 450 nm, and more preferably in a range of 380 nm to 450 nm. If the LED has the peak wavelength in the range described above, it is possible to obtain an advantage of cost reduction.

The light illumination energy for the temporary curing is not limited, and it is changed according to the ink composition. However, the ultraviolet ray illumination energy is preferably equal to or less than 300 mJ/cm$^2$, more preferably in a range of 5 to 200 mJ/cm$^2$. If the ultraviolet ray illumination energy is within this range described above, bleeding is prevented.

Main Curing Process

In the main curing process (S5), the temporarily-cured first coated film and the temporarily-cured second coated film are cured through the light illumination from the main curing light source, so that an image is formed.

The main curing process (S5) is performed by the main curing illumination unit 44 of the illumination unit 40 of the printer 1 (recording apparatus). As described above, the light source of the light illumination from the main curing light source which may be used for the main curing illumination unit 44 may include an LED or a lamp. The lamp is not particularly limited and may include, for example, a chemical lamp such as a metal halide lamp, a xenon lamp, and a carbon arc lamp and a mercury lamp such as a low pressure mercury lamp and a high pressure mercury lamp. Among these lamps, a mercury lamp or a metal halide lamp is preferred as sufficient curability may be obtained.

As described above, the illumination energy in the main curing process, that is, the illumination energy during the curing of the coated film made from a light curable type ink set described later through the light illumination from the main curing light source is in a range of 200 to 800 mJ/cm$^2$, preferably in a range of 250 to 750 mJ/cm$^2$, and more preferably in a range of 300 to 700 mJ/cm$^2$. If the illumination energy is equal to or more than 200 mJ/cm$^2$, the transparency of the cured film of the clear ink becomes good. On the other hand, if the illumination energy is equal to or less than 800 mJ/cm$^2$, it is possible to obtain good color stability.

In addition, in the case where the main curing process for the clear ink and the main curing process for the color ink are performed simultaneously, the illumination energy for the clear ink and the illumination energy for the color ink may be configured to be the same illumination energy. Particularly preferably, in the case where the main curing process for the clear ink and the main curing process for the color ink are separately performed, the illumination energy for the clear ink and the illumination energy for the color ink may also be configured to be different from each other. However, even in these cases, in order to simplify the recording apparatus or the recording method by shortening the time necessary for the type of the main curing light source used for the main curing process for the clear ink and the main curing process for the color ink or the main curing process, the illumination energy of the main curing process for the clear ink and the illumination energy of the main curing process for the color ink are configured to be in the range described above.

In addition, in the specification, the illumination energy denotes illumination energy when the film thickness of the coated film after the curing thereof is evaluated to be 10 μm.

Herein, the illumination energy according to the embodiment is the illumination energy from the main curing light source, and the illumination energy from the temporary curing light source is not taken into consideration. This is because there is a difference in the wavelength due to a difference in the type of the light source.

In addition, in the embodiment, the main curing process may be performed without performing the above-described first temporary curing process and the above-described second temporary curing process. In other words, when the second coated film is formed on the first coated film, which is formed in the above-described first coated film process, in the above-described second coated film formation process, the above-described first temporary curing process may be performed on the first coated film, and the above-described first temporary curing process may not be performed thereon. In the case where the first temporary curing process and the second temporary curing process are not performed, the bleeding may be reduced by performing the main curing process in a short time after the first coated film formation process and the second coated film formation process are performed. For example, the main curing process may be performed within one second after the coated film formation process is completed, preferably within 0.1 seconds.

In addition, in the case where the first temporary curing and the second temporary curing are performed and the case where the main curing is performed without performing the first temporary curing and the second temporary curing, the first curing process may be performed within one second after the coated film formation process is completed, preferably within 0.1 seconds.

In addition, the embodiment may be used for applications where the bleeding is not a problem.

In the case where the main curing process is performed without performing the first temporary curing process and the second temporary curing process, in the ink jet printer of FIG. 2, recording may be performed with the temporary curing illumination units 42e and 42f being turned OFF, or recording may be performed without the temporary curing illumination unit being installed. In the embodiment, in the case where the first temporary curing process and the second temporary curing process are performed or in the case where the processes are not performed, "main curing", "the main curing light source", "the main curing illumination unit", and "main curing process" are simply referred to as "curing", a "light source", a "illumination unit", and a "curing process", respectively.

In addition, in the case where the embodiment is implemented by using the above-described serial printer, if the main curing process is performed without performing the first temporary curing process and the second temporary curing process, for example, in the carriage, the curing (main curing) may be performed by a light source provided at the main scan direction downstream side of the head ejecting the ink in the main scanning similarly to the main scanning in which the ink is ejected.

Illumination Intensity of Illumination Unit

The illumination energy by each of the illumination units may be calculated by multiplying the illumination continuation time with the illumination intensity of the illumination unit. In the illumination, it is preferable that the illumination intensity of the illumination unit is configured to be constant and the illumination energy is adjusted by adjusting the illumination continuation time. The adjustment of the illumination continuation time may be performed by adjusting the illumination rate and the illuminated area at the time when the illumination unit performs relative scanning with respect to the recording medium. The illumination intensity of the temporary curing illumination unit is preferably in a range of 100 to 2000 $mW/cm^2$, more preferably in a range of 100 to 1000 $mW/cm^2$, and particularly preferably in a range of 100 to 500 $mW/cm^2$. On the other hand, the illumination intensity of the main curing light source is preferably in a range of 100 to 2000 $mW/cm^2$, more preferably in a range of 500 to 2000 $mW/cm^2$, and particularly preferably in a range of 800 to 2000 $mW/cm^2$. Besides the mercury lamp or the metal halide lamp, a light-emitting diode may also be used as the main curing light source.

Light Curable Type Ink Set

The embodiment of the invention relates to a light curable type ink set used for the recording method according to the above-described embodiment. The light curable type ink set (specified light curable type ink set) includes a light curable type color ink composition and a light curable type clear ink composition which have predetermined compositions.

Light Curable Type Color Ink Composition

The light curable type color ink composition constituting the light curable type ink set contains a polymerizable compound, a photopolymerization initiator, and a coloring material. The photopolymerization initiator contains (1) an acylphosphine oxide-based photopolymerization initiator and (2) at least one of a thioxanthone-based photopolymerization initiator and/or an a amino alkyl phenone-based photopolymerization initiator. In addition, the contained amount of at least any one of a thioxanthone-based photopolymerization initiator and/or an α amino alkyl phenone-based photopolymerization initiator contained in the color ink composition is a predetermined amount with respect to the total mass of the color ink composition (100 mass %).

Light Curable Type Clear Ink Composition

On the other hand, the light curable type clear ink composition constituting light curable type ink set contains a polymerizable compound and a photopolymerization initiator. The photopolymerization initiator contains an acylphosphine oxide-based photopolymerization initiator. In addition, the contained amount of acylphosphine oxide-based photopolymerization initiator contained in the clear ink composition is a predetermined amount with respect to the total mass of the clear ink composition.

Hereinafter, an additive agent (constituent) which is contained or may be contained in the light curable type color ink composition and the light curable type clear ink composition (hereinafter, collectively and simply referred to as an "ink composition") according to the embodiment will be described.

Photopolymerization Initiator

The photopolymerization initiator contained in the ink composition according to the embodiment is used to perform printing by curing the ink existing on the surface of the recording medium by the photopolymerization through illumination of the ultraviolet rays. By using the ultraviolet rays (UV) among the radioactive rays, it is possible to obtain excellent stability and to suppress the cost of the light source lamp.

Acylphosphine Oxide-Based Photopolymerization Initiator

Each of the color ink composition and the clear ink composition according to the embodiment contains an acylphosphine oxide-based photopolymerization initiator. Therefore, the LED tack-free property becomes excellent.

An acylphosphine oxide compound constituting the acylphosphine oxide-based photopolymerization initiator is not particularly limited and may include, for example, 2,4,6-trimethyl benzoyl diphenyl phosphine oxide, 2,4,6-triethyl benzoyl diphenyl phosphine oxide, 2,4,6-triphenyl benzoyl diphenyl phosphine oxide, bis-(2,4,6-trimethyl benzoyl)-phenyl phosphine oxide, and bis-(2,6-dimethoxy benzoyl)-2,4,4-trimethyl pentyl phosphine oxide.

A commercialized product of the acylphosphine oxide-based photopolymerization initiator may include, for example, DAROCUR TPO (2,4,6-trimethyl benzoyl-diphenyl-phosphine oxide), IRGACURE 819 (bis(2,4,6-trimethyl benzoyl)-phenyl phosphine oxide), and CGI 403 (bis-(2,6-dimethoxy benzoyl)-2,4,4-trimethyl pentyl phosphine oxide).

Thioxanthone-Based Photopolymerization Initiator

The color ink composition according to the embodiment may contain a thioxanthone-based photopolymerization initiator together with the above-described acylphosphine oxide-based photopolymerization initiator. Therefore, the LED tack-free property becomes excellent.

A thioxanthone compound constituting the thioxanthone-based photopolymerization initiator is not particularly limited and may include, for example, thioxanthone, 2-methyl thioxanthone, 2,4-diethyl thioxanthone, 2-isopropyl thioxanthone, 4-isopropyl thioxanthone, 2-chloro thioxanthone, and 2,4-diethyl thioxanthone.

A commercialized product of the thioxanthone compound may include, for example, KAYACURE DETX-S (2,4-diethyl thioxanthone) (trade name of product manufactured by Nippon Kayaku Co., Ltd.), KAYACURE ITX (2-/4-isopropyl thioxanthone), and the like, and 2,4-diethyl thioxanthone is particularly preferred.

α Amino Alkyl Phenone-Based Photopolymerization Initiator

The color ink composition according to the embodiment may contain an α amino alkyl phenone-based photopolymerization initiator together with the above-described acylphosphine oxide-based photopolymerization initiator. Therefore, the LED tack-free property becomes excellent.

As an α amino alkyl phenone compound constituting the α amino alkyl phenone-based photopolymerization initiator, 1,3-α amino alkyl phenone compound is preferred, and a specific example may include 2-benzyl-2-dimethyl amino-1-(4-morpholino phenyl)-butanone-1,2-(dimethyl amino)-2-[(4-methyl phenyl)methyl]-1-[4-(4-morpholinyl)phenyl]-1-butanone, 2-methyl-1-(4-methyl thiophenyl)-2-morpholino-propane-1-one.

A commercialized product of the α amino alkyl phenone-based photopolymerization initiator may include, for example, IRGACURE 369 (2-benzyl-2-dimethyl amino-1-(4-morpholino phenyl)-butanone 1), IRGACURE 379 (2-(dimethyl amino)-2-[(4-methyl phenyl)methyl]-1-[4-(4-morpholinyl)phenyl]-1-butanone), and IRGACURE 907 (2-methyl-1-(4-methyl thiophenyl)-2-morpholino-propane-1-one).

Other Photopolymerization Initiators

As other photopolymerization initiators, although a material which generates active species such as radicals or cations by the energy of the light (ultraviolet rays) to initiate the polymerization of the polymerizable compound may be used without limitation, an optical radical polymerization initiator or a light cation polymerization initiator may be used. Among them, the optical radical polymerization initiator may be preferably used.

The optical radical polymerization initiator may include, for example, aromatic ketones, aromatic onium salt compounds, organic peroxides, thio compounds (compounds containing a thio phenyl radical or the like) excluding thioxanthone compounds, hexaaryl-biimidazole compounds, ketoxime ester compounds, borate compounds, azinnium compounds, metallocene compounds, active ester compounds, compounds having a carbon halogen bond, and alkyl amine compounds excluding α amino alkyl phenone compounds.

A specific example of the optical radical polymerization initiator may include acetophenone, acetophenone benzyl ketal, 1-hydroxy cyclohexyl phenyl ketone, 2,2-dimethoxy-2-phenyl acetophenone, xanthone, fluorenone, benzaldehyde, fluorene, anthraquinone, triphenyl amine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl phenyl)-2-hydroxy-2-methyl propane-1-one, 2-hydroxy-2-methyl-1-phenyl propane-1-one, 2-methyl-1-[4-(methyl thio) phenyl]-2-morpholino-propane-1-one, triethanol amine, methyl diethanol amine, triisopropanol amine, 4,4'-dimethyl amino benzophenone, 4,4'-diethyl amino benzophenone, 2-dimethyl amino benzoic acid ethyl, 4-dimethyl amino benzoic acid ethyl, 4-dimethyl amino benzoic acid isoamyl, 4-dimethyl amino benzoic acid (n-butoxy)ethyl, and 4-dimethyl amino benzoic acid 2-ethyl hexyl.

A commercialized product of the optical radical polymerization initiator may include, for example, IRGACURE 651 (2,2-dimethoxy-1,2-diphenyl ethane-1-one), IRGACURE 184 (1-hydroxy-cyclohexyl-phenyl-ketone), DAROCUR 1173 (2-hydroxy-2-methyl-1-phenyl-propane-1-one), IRGACURE 2959 (1-[4-(2-hydroxy ethoxy)-phenyl]-2-hydroxy-2-methyl-1-propane-1-one), IRGACURE 127 (2-hydroxy-1-{4-[4-(2-hydroxy-2-methyl propionyl)-benzyl]phenyl]-2-methyl-propane-1-one}, IRGACURE 907 (2-methyl-1-(4-methyl thio phenyl)-2-morpholino-propane-1-one), IRGACURE 784 (bis(η5-2,4-cyclopentadiene 1-yl)-bis(2,6-difluoro-3-(1H-pyrrole-1-yl)-phenyl) titanium), IRGACURE OXE 01 (1. 2-octane dione, 1-[4-(phenyl thio)-, 2-(O-benzoyl oxime)]), IRGACURE OXE 02 (ethanone, 1-[9-ethyl-6-(2-methyl benzoyl)-9H-carbazole-3-yl]-, 1-(O-acetyl oxime)), IRGACURE 754 (a mixture of oxyphenyl acetic acid, 2-[2-oxo-2-phenyl acetoxy ethoxy]ethyl ester and oxyphenyl acetic acid, 2-(2-hydroxy ethoxy)ethyl ester), Lucirin TPO, LR8893, LR8970 (trade names of products manufactured by BASF), Uvecryl P36 (trade name of product manufactured by UCB), and the like.

With respect to the photopolymerization initiator, one species may be individually used, or a combination of two or more species may be used.

Since the ultraviolet ray curing rate of the photopolymerization initiator is sufficiently high and the melt remaining portion of the photopolymerization initiator or the coloring derived from the photopolymerization initiator is barely present, the photopolymerization initiator is preferably in a range of 5 to 12 mass % with respect to the total mass (100 mass %) of the ink composition.

Particularly, the contained amount of at least any one of (2) a thioxanthone-based photopolymerization initiator and/or an α amino alkyl phenone-based photopolymerization initiator contained in the color ink composition is in a range of 0.5 to 4 mass % with respect to the total mass of the color ink composition, preferably in a range of 1 to 4 mass %, more preferably in a range of 1.5 to 2.5 mass %. If the contained amount is equal to or more than 0.5 mass %, the LED tack-free property is excellent. On the other hand, if the contained amount is equal to or less than 4 mass %, the color stability of the ink is excellent. In the case where a thioxanthone-based photopolymerization initiator among the thioxanthone-based photopolymerization initiator and the α amino alkyl phenone-based photopolymerization initiator is particularly contained, the adhesiveness is also excellent.

In addition, it is preferable that the clear ink composition does not contain the thioxanthone-based photopolymerization initiator or the α amino alkyl phenone-based photopolymerization initiator. This is because, in the case where the thioxanthone-based photopolymerization initiator and the α amino alkyl phenone-based photopolymerization initiator are contained in the clear ink composition, the transparency may deteriorate after the color is stabilized similarly to the case where the acylphosphine oxide-based photopolymerization initiator is contained.

In addition, the contained amount of (1) acylphosphine oxide-based photopolymerization initiator contained in the color ink composition is preferably in a range of 4 to 12 mass % with respect to the total mass of the color ink composition, more preferably in a range of 5 to 10 mass %. If the contained amount is within this range described above, when the thioxanthone-based initiator or the α alkyl phenone-based initiator is combined thereto, it is possible to obtain a good LED tack-free property.

In addition, the contained amount of acylphosphine oxide-based photopolymerization initiator contained in the clear ink composition is in a range of 5 to 12 mass % with respect to the total mass of the clear ink composition, preferably in a range of 6.5 to 9.5 mass %, more preferably in a range of 7 to 9 mass %. If the contained amount is equal to or more than 5 mass %, the LED tack-free property is excellent. On the other hand, if the contained amount is equal to or less than 12 mass %, the transparency of the clear ink is excellent.

In addition, if the light polymerizable compound is used as the above-described polymerizable compound, the addition of the photopolymerization initiator may be omitted. However, the use of the photopolymerization initiator is very appropriate because the photopolymerization initiator allows the initiation of the polymerization to be easily adjusted.

Polymerizable Compound

As the polymerizable compound contained in the ink composition according to the embodiment, although a compound which is polymerized to be solidified due to the function of the above-described photopolymerization initiator during the illumination of the light such as an ultraviolet rays may be used without limitation, various monomers and oligomers having a monofunctional radical, a two functional radical, and a multifunctional radical such as a trifunctional or higher radical may be used.

The monomer may include, for example, an unsaturated carboxylic acid such as a (meth)acrylic acid, an itaconic acid, a crotonic acid, an isocrotonic acid, and a maleic acid, salts thereof, or ester, urethane, amides, and anhydrides thereof, acrylonitrile, styrene, various unsaturated polyesters, unsaturated polyethers, unsaturated polyamides, and unsaturated urethanes. In addition, the oligomer may include, for example, an oligomer formed from the above-described monomers such as a straight-chain acryl oligomer, an epoxy (meth)acrylate, an aliphatic urethane(meth)acrylate, an aromatic urethane(meth)acrylate, and a polyester(meth)acrylate.

In addition, other monofunctional monomers or multifunctional monomers may contain an N-vinylcompound. The N-vinylcompound may include N-vinylformamide, N-vinylcarbazole, N-vinylacetamide, N-vinylpyrrolidone, N-vinylcaprolactam, acryloyl morpholine, derivatives thereof, and the like. Among them, N-vinylcaprolactam is preferred, since it may improve the adhesiveness to a base material.

Among the materials listed above, an ester of a (meth) acrylic acid, that is, a (meth)acrylate is preferred.

Among the (meth)acrylates described above, the monofunctional (meth)acrylate may include, for example, isoamyl (meth)acrylate, stearyl(meth)acrylate, lauryl(meth)acrylate, octyl(meth)acrylate, decyl(meth)acrylate, isomiristyl(meth) acrylate, isostearyl(meth)acrylate, 2-ethyl hexyl-diglycol (meth)acrylate, 2-hydroxy butyl(meth)acrylate, butoxy ethyl (meth)acrylate, ethoxy diethylene glycol(meth)acrylate, methoxy diethylene glycol(meth)acrylate, methoxy polyethylene glycol(meth)acrylate, methoxy propylene glycol(meth) acrylate, phenoxy ethyl(meth)acrylate, Tetrahydrofurfuryl (meth)acrylate, isobornyl(meth)acrylate, 2-hydroxy ethyl (meth)acrylate, 2-hydroxy propyl(meth)acrylate, 2-hydroxy-3-phenoxy propyl(meth)acrylate, lactone-modified flexible (meth)acrylate, t-butyl cyclohexyl(meth)acrylate, dicyclopentanyl(meth)acrylate, dicyclopentenyl oxyethyl(meth) acrylate, dicyclopentenyl(meth)acrylate, (meth)acrylic acid 2-(2-vinyloxy ethoxyethyl)ethyl and isobornyl(meth)acrylate, and acryloylmorpholine.

Among the (meth)acrylates described above, the two functional (meth)acrylate may include, for example, triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butane diol di(meth)acrylate, 1,6-hexane diol di(meth) acrylate, 1,9-nonane diol di(meth)acrylate, neopentyl glycol di(meth)acrylate, dimethylol tricyclodecane di(meth)acrylate, EO (ethylene oxide) additive di(meth)acrylate of bisphenol A, PO (propylene oxide) additive di(meth)acrylate of bisphenol A, hydroxyl pivalic acid neopentyl glycol di(meth) acrylate, dipropylene glycol di(meth)acrylate, and polytetramethylene glycol di(meth)acrylate.

Among the (meth)acrylates described above, the multifunctional (meth)acrylate such as trifunctional or higher (meth)acrylate may include, for example, trimethylol propane tri(meth)acrylate, EO modified trimethylol propane tri (meth)acrylate, pentaerythritol tri(meth)acrylate, pentaerythritol tetra(meth)acrylate, dipentaerythritol hexa(meth) acrylate, ditrimethylol propanetetra(meth)acrylate, glyceryl propoxy tri(meth)acrylate, caprolactone modified trimethylol propane tri(meth)acrylate, pentaerythritol ethoxy tetra(meth) acrylate, and caprolactam modified dipentaerythritol hexa (meth)acrylate.

Among the materials, it is preferable that the monofunctional (meth)acrylate is contained as the polymerizable compound in that the extraction stability during the ink jet recording period may be easily obtained due to a high extensibility of a coated film during the curing period and a low viscosity. In addition, it is preferable that the monofunctional (meth) acrylate and the two functional (meth)acrylate are simultaneously used in that the hardness of the coated film is increased. With respect to the polymerizable compound, one species may be individually used, or two or more species may be simultaneously used.

In addition, it is preferable that the monofunctional (meth) acrylate has one or more types of skeletons selected from a group consisting of an aromatic ring skeleton, a saturated alicyclic skeleton, and an unsaturated alicyclic skeleton. If the polymerizable compound is a monofunctional (meth)acrylate having the above-described skeleton, the viscosity of the ink composition is decreased, and the above-described polymer containing an epoxy radical may be effectively dissolved into the ink composition.

The monofunctional (meth)acrylate having an aromatic ring skeleton may include, for example, phenoxy ethyl(meth) acrylate and 2-hydroxy-3-phenoxy propyl(meth)acrylate. In addition, the monofunctional (meth)acrylate having a saturated alicyclic skeleton may include, for example, isobornyl (meth)acrylate, t-butyl cyclohexyl(meth)acrylate and dicyclopentanyl(meth)acrylate. In addition, the monofunctional (meth)acrylate having an unsaturated alicyclic skeleton may include, for example, dicyclopentenyl oxyethyl(meth)acrylate. In addition, although (meth)acrylate is exemplified above, a simple acrylate may be used similarly.

With respect to the polymerizable compound, one species may be individually used, or two or more species may be simultaneously used.

The contained amount of the polymerizable compound is preferably equal to or more than 20 mass % with respect to the total mass of the color ink composition or the clear ink composition, more preferably in a range of 60 to 90 mass %. If the contained amount is within this range described above, the preservation stability and the curability are good.

In addition, it is particularly preferable that a monofunctional monomer and a multifunctional monomer are contained in the color ink composition and/or the clear ink composition. Preferably, at least any one of N-vinylcaprolactam, phenoxy ethyl(meth)acrylate, isobornyl(meth)acrylate, dicyclopentenyl(meth)acrylate, and (meth)acrylic acid 2-(2-vinyloxy ethoxyethyl)ethyl is contained as a monofunctional monomer. Preferably, at least any one of tripropylene glycol di(meth)acrylate, dipropylene glycol di(meth)acrylate, and 1,6-hexane diol di(meth)acrylate is contained as a multifunctional monomer.

Coloring Material

The ink composition according to the embodiment may further contain a coloring material. With respect to the coloring material, at least one of a pigment and/or a dye may be used. Herein, as described above, in the specification, the color ink denotes all color ink excluding colorless transparent clear ink. Therefore, unlike the color ink composition, the clear ink composition according to the embodiment does not contain a coloring material.

Pigment

In the embodiment, a pigment may be used as the coloring material, so that it is possible to improve the light resistance of the ink composition. With respect the pigment, both of an inorganic pigment and an organic pigment may be used.

As the inorganic pigment, carbon black (C. I. Pigment Black 7) such as a furnace black, a lamp black, an acetylene black, and a channel black, iron oxide, and titanium oxide may be used.

The organic pigment may include azo pigments such as insoluble azo pigments, condensed azo pigments, azo lake, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, or the like), stained lakes (basic dye type lakes, acidic dye type lakes), nitro pigments, nitroso pigments, aniline blacks, and daylight fluorescent pigments.

More specifically, a carbon black used as the black ink may include No. 2300, No. 900, MCF88, No. 33, No. 40, No. 45, No. 52, MA7, MA8, MA100, No. 2200B, and the like (trade names of products manufactured by Mitsubishi Chemical Corporation), Raven 5750, Raven 5250, Raven 5000, Raven 3500, Raven 1255, Raven 700, and the like (trade names of products manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (trade names of products manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex, V, Printex 140U, Special Black 6, Special Black 5, Special Black 4A, Special Black 4, and the like (trade names of products manufactured by Degussa).

The pigment used for white ink may include C. I. Pigment White 6, 18, and 21.

The pigment used for yellow ink may include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for magenta ink may include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57: 1, 88, 112, 114, 122, 123, 144, 146, 149, 150, 166, 168, 170, 171, 175, 176, 177, 178, 179, 184, 185, 187, 202, 209, 219, 224, and 245 and C. I. Pigment Violet 19, 23, 32, 33, 36, 38, 43, and 50.

The pigment used for cyan ink may include C. I. Pigment Blue 1, 2, 3, 15, 15: 1, 15: 2, 15: 3, 15: 34, 15: 4, 16, 18, 22, 25, 60, 65, and 66 and C. I. Vat Blue 4 and 60.

In addition, pigments excluding the magenta, cyan, yellow pigments may include, for example, C. I. Pigment Green 7 and 10, C. I. Pigment Brown 3, 5, 25, and 26, and C. I. Pigment Orange 1, 2, 5, 7, 13, 14, 15, 16, 24, 34, 36, 38, 40, 43, and 63.

With respect to the pigment, one species may be individually used, or two or more species may be simultaneously used.

Dye

According to the embodiment, a dye may be used as the coloring material. The dye is not particularly limited, and an acidic dye, a direct dye, a reactive dye, and a basic dye may be used. The dyes may include, for example, C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. I. Reactive Red 14, 32, 55, 79, and 249, and C. I. Reactive Black 3, 4, and 35.

With respect to the dye, one species may be individually used, or two or more species may be simultaneously used.

The contained amount of the coloring material is preferably in a range of 2 to 25 mass % with respect to the total mass of the color ink composition. In the case where the contained amount is equal to or more than 2 mass %, the chromogenic property becomes good. In the case where the contained amount is equal to or less than 25 mass %, since the ultraviolet ray absorption of the coloring material has less influence on the curability, the curability becomes good. In other words, if the contained amount is within this range described above, both of the chromogenic property and the curability become good.

Surfactant

The ink composition according to the embodiment may further contain a surfactant in order to prevent repelling to the base material. The surfactant is not particularly limited. For example, as a silicon-based surfactant, polyester modified silicon or polyether modified silicon may be used. Particularly, it is preferable that polyether modified polydimethyl siloxane or polyester modified polydimethyl siloxane be used. A specific example may include BYK-347, BYK-348, BYK-UV3500, 3510, 3530, and 3570 (trade names of products manufactured by BYK Chemie Japan (BYK Japan KK)).

Polymerization Inhibitor

The ink composition according to the embodiment may further contain a polymerization initiator in order to obtain good preservation stability. The polymerization inhibitor which may be contained in the light curable type clear ink composition is not particularly limited. IRGASTAB UV10 and UV22 (trade names of products manufactured by BASF), hydroquinone monomethyl ether (trade name of product manufactured by KANTO CHEMICAL CO., INC), or the like may be used.

Other Additive Agents

The ink composition according to the embodiment may contain an additive agent (constituent) besides the above-described additive agents. The constituents are not particularly limited and may include, for example, a polymerization accelerator, a penetration enhancer, a wetting agent (humectant), and other additive agents in the related art. Other additive agents described above may include, for example a pigment dispersant, a fixer, a fungicide, an antiseptic agent, an antioxidant, a UV absorber, a chelate agent, a pH adjuster, and a viscosity improver in the related art.

Recording Medium

A recording material may be obtained by ejecting the ink composition according to the embodiment on the recording medium by using the recording method. The recording medium may include an absorptive recording medium or non-absorptive recording medium. The recording method according to the embodiment may be applied to a variety of the to-be-recorded media having various absorption performances ranging from a non-absorptive recording medium which may not be easily penetrated by an aqueous ink composition thereto to an absorptive recording medium which may be easily penetrated by an aqueous ink composition thereto. However, in the case where the ink composition is applied to the non-absorptive recording medium, a drying process may be necessarily provided after the curing through the illumination of the ultraviolet rays.

The absorptive recording medium is not particularly limited and may include, for example, a plain paper such an electro-photographic paper having a high permeability of aqueous ink, ink jet paper (ink jet dedicated paper having an ink absorption layer made from silica particles or aluminum particles or an ink absorption layer made from a hydrophilic polymer such as polyvinylalcohol (PVA) or polyvinylpyrrolidone (PVP)), art paper used for general offset printing having a relatively low permeability of aqueous ink, coat paper, cast paper, and the like.

The non-absorptive recording medium is not particularly limited and may include, for example, a plastic film or plate such as polyvinyl chloride, polyethylene, polypropylene, and polyethylene terephthalate (PET), a metal plate such as iron, silver, copper, and aluminum, a metal plate or a plastic film produced by depositing various metals, an alloy plate such as stainless steel or brass, or the like.

In this manner, according to the embodiment, it possible to provide a recording method and a light curable type ink set used for the recording method, of which the LED tack-free property, the color stability of ink, and the transparency of clear ink are excellent. Particularly, in the single pass type high speed color printing, it is possible to obtain a print material having an excellent color stability by adjusting the type and contained amount of each of the photopolymerization initiators contained in the color ink composition and the clear ink composition and the illumination energy during the main curing period.

EXAMPLES

Hereinafter, although the embodiments of the invention are described more in detail by using examples and comparative examples, the embodiments are not limited to these examples.

Constituents Used

The constituents used in the following examples and comparative examples are as follows.

Pigment Dispersion Liquid

As a pigment, IRGALITE BLUE GLO (C. I. Pigment Blue, 15: 3, manufactured by BASF) is used; and as a dispersing agent, SOLSPERSE 36000 (trade name of product manufactured by Noveon Inc.) (1 mass % with respect to a pigment dispersion liquid) is used. Next, the pigment is dispersed in a dispersion medium (TPGDA), so that a pigment dispersion liquid having a pigment concentration of 15 mass % is produced.

Photopolymerization Initiator

KAYACURE DETX-S (thioxanthone type, trade name of product manufactured by Nippon Kayaku Co., Ltd., abbreviated to "DETX-S" in Tables 1 and 2)

IRGACURE 369 (1,3-α amino alkyl phenone type, trade name of product manufactured by BASF, abbreviated to "369" in Tables 1 and 2)

IRGACURE 819 (acylphosphine oxide type, trade name of product manufactured by BASF, abbreviated to "819" in Tables 1 and 2)

DAROCURE TPO (acylphosphine oxide type, trade name of product manufactured by BASF, abbreviated to "TPO" in Tables 1 and 2)

Polymerizable Compound tripropylene glycol diacrylate (V#310HP (trade name), manufactured by OSAKA ORGANIC CHEMICAL INDUSTRY LTD., abbreviated to "TPGDA" in Tables 1 and 2)

N-vinylcaprolactam (vinylcaprolactam (trade name), manufactured by BASF, abbreviated to "NVC" in Tables 1 and 2)

Polymerization Inhibitor

Irgastab UV22 (trade name of product manufactured by BASF, abbreviated to "UV22" in Tables 1 and 2)

Surfactant silicon-based surface regulating agent BYK-UV3500 (trade name of product manufactured by BYK, abbreviated to "UV3500" in Tables 1 and 2)

Production of Light Curable Type Cyan Ink Composition

The light curable type cyan ink composition (hereinafter, simply referred to as "cyan") is produced by adding the constituents listed in the following Table 1 so as to have the composition (unit: mass %) listed in Table 1 and stirring the resulting product by a high-speed water cooling stirrer.

TABLE 1

| | | Light Curable Type Cyan Ink Composition | | | | |
|---|---|---|---|---|---|---|
| | | Composition 1 | Composition 2 | Composition 3 | Composition 4 | Composition 5 |
| Pigment Dispersive Wave (Pigment Concentration 15%) | | 20 | 20 | 20 | 20 | 20 |
| Photopolymerization Initiator | DETX-S | 3 | — | 0.5 | 5 | — |
| | 369 | — | 3 | — | — | — |
| | 819 | 1.5 | 1.5 | 1.5 | 1 | 2.5 |
| | TPO | 2.5 | 2.5 | 2.5 | 1 | 2.5 |
| Polymerizable Compound | TPGDA | 55.9 | 55.9 | 58.4 | 55.9 | 57.9 |
| | NVC | 15 | 15 | 15 | 15 | 15 |
| Polymerization Inhibitor | UV-22 | 1.6 | 1.6 | 1.6 | 1.6 | 1.6 |
| Surfactant | UV3500 | 0.5 | 0.5 | 0.5 | 0.5 | 0.5 |
| Total Sum | | 100 | 100 | 100 | 100 | 100 |

TABLE 1-continued

| | | Light Curable Type Cyan Ink Composition | | | | |
|---|---|---|---|---|---|---|
| | | Composition 6 | Composition 7 | Composition 8 | Composition 9 | Composition 10 |
| Pigment Dispersive Wave (Pigment Concentration 15%) | | 20 | 20 | 20 | 20 | 20 |
| Photopolymerization Initiator | DETX-S | — | 3 | 3 | — | 0.1 |
| | 369 | — | — | — | 3 | — |
| | 819 | 5.5 | 3.5 | — | 3.5 | 1.5 |
| | TPO | 6.5 | 6.5 | — | 6.5 | 2.5 |
| Polymerizable Compound | TPGDA | 50.9 | 49.9 | 59.9 | 49.9 | 58.8 |
| | NVC | 15 | 15 | 15 | 15 | 15 |
| Polymerization Inhibitor | UV-22 | 1.6 | 1.6 | 1.6 | 1.6 | 1.6 |
| Surfactant | UV3500 | 0.5 | 0.5 | 0.5 | 0.5 | 0.5 |
| Total Sum | | 100 | 100 | 100 | 100 | 100 |

Production of Light Curable Type Clear Ink Composition

The light curable type clear ink composition (hereinafter, simple referred to as "clear") is produced by adding the constituents listed in the following Table 2 so as to have the composition (unit: mass %) listed in Table 2 and stirring the resulting product by a high-speed water cooling stirrer.

each other. Next, the temporary curing is performed by illuminating the ultraviolet rays having the illumination energy of 10 mJ/cm$^2$ by the LED Firefly (trade name of product manufactured by Phoseon, peak wavelength 395 nm, the illumination intensity 100 mW/cm$^2$) of the second temporary curing illumination unit 42f.

TABLE 2

| | | Light Curable Type Clear Ink Composition | | | | |
|---|---|---|---|---|---|---|
| | | Composition 1 | Composition 2 | Composition 3 | Composition 4 | Composition 5 |
| Pigment Dispersive Wave (Pigment Concentration 15%) | | — | — | — | — | — |
| Photopolymerization Initiator | DETX-S | — | — | — | — | — |
| | 369 | — | — | — | — | — |
| | 819 | 2 | 2.1 | 4.5 | 5 | 2 |
| | TPO | 3 | 3.9 | 7.5 | 8 | 2 |
| Polymerizable Compound | TPGDA | 77.9 | 76.9 | 70.9 | 69.9 | 78.9 |
| | NVC | 15 | 15 | 15 | 15 | 15 |
| Polymerization Inhibitor | UV-22 | 1.6 | 1.6 | 1.6 | 1.6 | 1.6 |
| Surfactant | UV3500 | 0.5 | 0.5 | 0.5 | 0.5 | 0.5 |
| Total Sum | | 100 | 100 | 100 | 100 | 100 |

Examples 1 to 6 and Comparative Examples 1 to 6

The evaluation 1 by the light curable type ink set is performed. The evaluation items are as follows. The results are listed in the following Tables 3 and 4.

1. Evaluation of Image Quality Relating to Color Stability

The evaluation is performed by using the ink jet printer (ink jet printer 1) illustrated in FIG. 2. First, under the conditions of the ink ejection mass 15 ng and the resolution 720 dpi×720 dpi, a 1 inch×1 inch beta pattern for the cyan ink is printed. Next, the temporary curing is performed by illuminating the ultraviolet rays having the illumination energy of 10 mJ/cm$^2$ by the LED Firefly (manufactured by Phoseon, peak wavelength 395 nm, illumination intensity 100 mW/cm$^2$) of the first temporary curing illumination unit 42e.

Subsequently, under the conditions of the ink ejection mass 15 ng and the resolution 720 dpi×720 dpi, a, 1 inch×2 inch beta pattern for the clear ink is over-coated. At this time, since the evaluation is performed by observing the presence of the occurrence of the bleeding in the boundary portion between the beta pattern for the cyan ink and the beta pattern for the clear ink, the center of the beta pattern for the cyan ink and the center of the beta pattern for the clear ink are aligned with Next, the light curable type ink is cured by performing the light illumination on the ink with the light having a predetermined accumulated energy (illumination energy during the main curing period) from the main curing light source by using a metal halide lamp (Name of main body illumination apparatus: UVAPRINT 300HPLK manufactured by Honle). Therefore, a test pattern where a cured film (image) is formed on the recording medium (#125-E20 (trade name of product manufactured by Toray Industries Inc.)) is obtained. In addition, the value of the illumination energy is measured by using an ultraviolet ray illuminometer UM-10 and a light-receiving unit UM-400 (trade name of product manufactured by KONICA MINOLTA SENSING, INC.).

L*, a*, and b* of the cured film are measured, and the time change in the color difference (ΔE) from the formation of the cured film is plotted by using the color after one week as a reference. The time interval taken by the time when ΔE is less than 2 is derived. In addition, the test pattern is produced by using the printing apparatus illustrated in FIGS. 1 and 2.

The evaluation standards are as follows. Among the evaluation standards, the standards 1, 2, and 3 are practically allowable.

3: less than 1 hour
2: equal to or more than 1 hour and less than 2 hours

1: equal to or more than 2 hours and less than 24 hours
0: equal to or more than 24 hours
2. Evaluation of Image Quality Relating to Bleeding The test pattern is obtained by the same method as that of "1. Evaluation of Image Quality Relating to Color Stability" described above.

The evaluation is performed by visual inspection of the test pattern. The evaluation standards are as follows.
A: There is no bleeding in the boundary portion between the beta pattern for the cyan ink and the beta pattern for the clear ink.
B: There is bleeding in the boundary portion between the beta pattern for the cyan ink and the beta pattern for the clear ink.

light illumination) during the temporary curing performed by the LED. In addition, the illumination apparatus used for the main curing is UVAPRINT 300HPLK (trade name) manufactured by Honle.

Evaluation Items Common to Cyan Ink and Clear Ink
1. LED Tack-Free Property

Lumirror #125-E20 (trade name of product manufactured by Toray Industries Inc., PET film) is coated with a light curable type ink by a bar coater so that the thickness thereof is 10 μm. Next, the coated ink is illuminated with an ultraviolet rays having luminance of 70 mW/cm² by LED "Firefly (trade name of product manufactured by Phoseon)" having a peak wavelength of 395 nm for a predetermined time. After

TABLE 3

|  | Example 1 | Example 2 | Example 3 | Example 4 | Example 5 | Example 6 |
|---|---|---|---|---|---|---|
| Accumulated Energy (During main curing Period) | 100 mJ/cm² | 400 mJ/cm² | 800 mJ/cm² | 200 mJ/cm² | 200 mJ/cm² | 200 mJ/cm² |
| Cyan Composition | Composition 1 | Composition 1 | Composition 1 | Composition 2 | Composition 1 | Composition 3 |
| Clear Composition | Composition 1 | Composition 1 | Composition 1 | Composition 1 | Composition 2 | Composition 1 |
| Evaluation of Image Quality (Color stability) | 3 | 2 | 1 | 3 | 3 | 3 |
| Evaluation of Image Quality (Bleeding) | A | A | A | A | A | A |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Accumulated Energy (During Main Curing Period) | 200 mJ/cm² | 200 mJ/cm² | 50 mJ/cm² | 1000 mJ/cm² | 200 mJ/cm² | 200 mJ/cm² |
| Cyan Composition | Composition 4 | Composition 5 | Composition 1 | Composition 1 | Composition 1 | Composition 1 |
| Clear Composition | Composition 2 | Composition 2 | Composition 1 | Composition 1 | Composition 5 | Composition 4 |
| Evaluation of Image Quality (Color Stability) | 0 | 3 | 3 | 0 | 3 | 3 |
| Evaluation of Image Quality (Bleeding) | A | B | A | A | A | A |

It may be understood from Tables 3 and 4 described above that, in the image of the test pattern where the clear image overlaps the cyan image, the color stability deteriorates and the bleeding occurs. Therefore, in order to more clearly check the relationship between the recording method for the light curable type ink set and the image quality, the evaluation (evaluation 2 by the ink set) is performed on an image of a different test pattern where the clear image does not overlap with the cyan image.

Examples 7 to 12 and Comparative Examples 7 to 12

The evaluation 2 by the ink set is performed. The evaluation items are as follows. The results are listed in the following Tables 5 and 6.

Herein, the following LED tack-free property is the evaluation of the tack-free property after the temporary curing (pinning) performed by using the LED. On the other hand, the accumulated energy listed in the Tables is a total amount of the energy of the light illumination during the main curing performed by using a metal halide lamp, and it does not include the energy of the light illuminations (first and second the illumination, the surface of the coated film is abraded by a cotton swab, and the illumination time until no scratch mark is formed is measured.

The evaluation standards are as follows.
2: equal to or more than 0 seconds and less than 30 seconds
1: equal to or more than 30 seconds and less than 60 seconds
0: equal to or more than 60 seconds
2. Color Stability The evaluation is performed by using the ink jet printer illustrated in FIG. 2. First, under the conditions of the ink ejection mass 15 ng and the resolution 720×720 dpi, a 1 inch×1 inch beta pattern for the cyan ink is printed. Next, the temporary curing is performed by illuminating the ultraviolet rays having the illumination energy of 10 mJ/cm² by the LED Firefly (manufactured by Phoseon) of the first temporary curing illumination unit 42e.

Next, the light curable type ink is cured by performing the light illumination on the ink with the light having a predetermined accumulated energy (illumination energy during the main curing period) from the main curing light source by using a metal halide lamp (Name of main body illumination apparatus: UVAPRINT 300HPLK manufactured by Honle). Therefore, a test pattern where a cured film (image) is formed on the recording medium (#125-E20 (manufactured by Toray Industries Inc.) is obtained. L*, a*, and b* of the cured film are measured, and the time change in the color difference (ΔE) from the formation of the cured film is plotted by using the color after one week as a reference. The time interval taken by the time when ΔE is less than 2 is derived.

The evaluation standards are as follows. Among the evaluation standards, the standards 1, 2, and 3 are practically allowable.

3: less than 1 hour
2: equal to or more than 1 hour and less than 2 hours
1: equal to or more than 2 hours and less than 24 hours
0: equal to or more than 24 hours 3. Evaluation of Image Quality Relating to Bleeding The evaluation is performed by using the ink jet printer illustrated in FIG. 2. First, under the conditions of the ink ejection mass 15 ng and the resolution 720×720 dpi, a 1 inch×1 inch beta pattern for the cyan ink is printed. Next, the temporary curing is performed by illuminating the ultraviolet rays having the illumination energy of 10 mJ/cm$^2$ by the LED Firefly (manufactured by Phoseon) of the first temporary curing illumination unit 42e.

Subsequently, under the conditions of the ink ejection mass 15 ng and the resolution 720 dpi×720 dpi, a 1 inch×2 inch beta pattern for the clear ink is coated over. At this time, since the evaluation is performed by observing the presence of the occurrence of the bleeding in the boundary portion between the beta pattern for the cyan ink and the beta pattern for the clear ink, the center of the beta pattern for the cyan ink and the center of the beta pattern for the clear ink are aligned with each other. Next, the temporary curing is performed by illuminating the ultraviolet rays having the illumination energy of 10 mJ/cm$^2$ by the LED Firefly (trade name of product manufactured by Phoseon) of the second temporary curing illumination unit 42f.

Next, the light curable type ink is cured by performing the light illumination on the ink with the light having a predetermined accumulated energy (illumination energy during the main curing period) from the main curing light source by using a metal halide lamp (Name of main body illumination apparatus: UVAPRINT 300HPLK, manufactured by Honle). Therefore, a test pattern where a cured film (image) is formed on the recording medium (#125-E20 (trade name of product manufactured by Toray Industries Inc.)) is obtained. In addition, the value of the illumination energy is measured by using an ultraviolet ray illuminometer UM-10 and a light-receiving unit UM-400 (trade name of product manufactured by KONICA MINOLTA SENSING, INC.).

The evaluation is performed by visual inspection of the test pattern described above. The evaluation standards are as follows.

A: There is no bleeding in the boundary portion between the beta pattern for the cyan ink and the beta pattern for the clear ink.
B: There is bleeding in the boundary portion between the beta pattern for the cyan ink and the beta pattern for the clear ink.

Evaluation Item of Clear Ink

4. Transparency of Clear Ink

The evaluation is performed by using the ink jet printer illustrated in FIG. 2. First, under the conditions of the ink ejection mass 15 ng and the resolution 720 dpi×720 dpi, beta printing is performed on a 1 inch×1 inch area by using the clear ink. Next, the temporary curing is performed by illuminating the ultraviolet rays having the illumination energy of 10 mJ/cm$^2$ by the LED Firefly (trade name of product manufactured by Phoseon) of the second temporary curing illumination unit 42f. Next, the light curable type ink is cured by performing the illumination of light having a predetermined accumulated energy (illumination energy during the main curing period) from the main curing light source by using a metal halide lamp (Name of main body illumination apparatus: UVAPRINT 300HPLK, manufactured by Honle). Therefore, a test pattern where a cured film (image) is formed on the recording medium (#125-E20[trade name] manufactured by Toray Industries Inc.) is obtained. The colorimetry is performed on the cured film and the substrate, so that a color difference (ΔE) therebetween is calculated.

The evaluation standards are as follows. Among the evaluation standards, standards 1, 2, and 3 are the standards which are practically allowable.

3: less than 2
2: equal to or more than 2 and less than 3
1: equal to or more than 3 and less than 4
0: equal to or more than 4

TABLE 5

|  | Example 7 | Example 8 | Example 9 | Example 10 | Example 11 | Example 12 |
| --- | --- | --- | --- | --- | --- | --- |
| Accumulated Energy (During Main Curing Period) | 100 mJ/cm$^2$ | 400 mJ/cm$^2$ | 800 mJ/cm$^2$ | 200 mJ/cm$^2$ | 200 mJ/cm$^2$ | 200 mJ/cm$^2$ |
| Cyan Composition | Composition 1 | Composition 1 | Composition 1 | Composition 2 | Composition 1 | Composition 3 |
| Tack-free Property | 2 | 2 | 2 | 2 | 2 | 1 |
| Color Stability | 3 | 2 | 1 | 3 | 3 | 3 |
| Clear Composition | Composition 1 | Composition 1 | Composition 1 | Composition 1 | Composition 2 | Composition 1 |
| Tack-free Property | 2 | 2 | 2 | 2 | 1 | 2 |
| Color Stability | 3 | 3 | 3 | 3 | 3 | 3 |
| Transparency | 1 | 1 | 3 | 1 | 2 | 1 |
| Evaluation of Image Quality (Bleeding) | A | A | A | A | A | A |

TABLE 6

|  | Comparative Example 7 | Comparative Example 8 | Comparative Example 9 | Comparative Example 10 | Comparative Example 11 | Comparative Example 12 |
|---|---|---|---|---|---|---|
| Accumulated Energy (During Main Curing Period) | 200 mJ/cm$^2$ | 200 mJ/cm$^2$ | 50 mJ/cm$^2$ | 1000 mJ/cm$^2$ | 200 mJ/cm$^2$ | 200 mJ/cm$^2$ |
| Cyan Composition | Composition 4 | Composition 5 | Composition 1 | Composition 1 | Composition 1 | Composition 1 |
| Tack-free Property | 2 | 0 | 2 | 2 | 2 | 2 |
| Color Stability | 0 | 3 | 3 | 0 | 3 | 3 |
| Clear Composition | Composition 2 | Composition 2 | Composition 1 | Composition 1 | Composition 5 | Composition 4 |
| Tack-free Property | 1 | 1 | 2 | 2 | 0 | 2 |
| Color Stability | 3 | 3 | 3 | 3 | 3 | 3 |
| Transparency | 2 | 2 | 0 | 3 | 2 | 0 |
| Evaluation of Image Quality (Bleeding) | A | B | A | A | A | A |

With respect to the image of the test pattern where different sites of the recording medium are coated with the cyan ink and the clear ink to be cured, it may be understood from Tables 5 and 6 described above that the color stability deteriorates or the bleeding occurs in the cyan image. In the clear image, although there is no problem in the color stability in all Examples and Comparative Examples, it may be newly understood that the transparency deteriorates, that is, there is initial coloring.

It may be understood from Tables 5 and 6 described above by separately performing the evaluation of the tack-free property of the cyan ink and the clear ink that there is a correlation between the bleeding of the cyan ink and the results of the evaluation of the tack-free property of each ink. In addition, Comparative Examples 8 and 11 will be described later.

Herein, the reason why the ink set is used will be described. As described above, although the test pattern is produced by using a printing apparatus illustrated in FIG. 2, the illumination energy by the main curing illumination unit 44 in FIG. 2 is the accumulated energy. In this case, the accumulated energy is common between the color ink and the clear ink. In order to distinguish the accumulated energy for the color ink with the accumulated energy for the clear ink, the main curing illumination unit 44 is necessarily provided for each ink color. However, in the case where the main curing illumination unit 44 is provided in this manner, the configuration thereof is complicated, and the processes of the recording method are complicated. Therefore, it is preferable that the main curing for the color ink and the clear ink is performed once by the main curing illumination unit 44. According, in order to perform the main curing once, it is preferable that the color ink and the clear ink are used as a set. In this case, each ink composition and the respective accumulated energy are necessarily selected so that all evaluation has a value other than zero with the common accumulated energy.

In addition, in FIG. 2, the illumination energy of the first temporary curing illumination unit 42e and the illumination energy of the second temporary curing illumination unit 42f are not included in the accumulated energy. Although the wavelength of the main curing illumination unit 44 (a metal halide lamp) is different from those of the first temporary curing illumination unit 42e and the second temporary curing illumination unit 42f (LED), the accumulated energy of the metal halide lamp influences the color stability or the transparency. On the other hand, the illumination of the first temporary curing illumination unit 42e and the second temporary curing illumination unit 42f may be performed by taking into consideration the bleeding or the like of each ink. With respect to the transport rate of the recording medium, the light illumination of the first temporary curing illumination unit 42e and the second temporary curing illumination unit 42f is performed with a sufficient energy amount, the curability of the ink composition is necessary. Evaluation of tack-free is performed by the standard.

Reference Examples 1 to 23

Next, as the reference, in order to check which conditions of the cyan ink and the clear ink constituting the ink set used for the recording method according to the invention are appropriate, separate evaluations (evaluation 3) of the ink are performed by using the ink compositions used in Examples and Comparative Examples and newly produced ink compositions. The evaluation items are as follows. The results are listed in the following Tables 7, 8, and 9 (in Table 8, "-" denotes that the evaluation is not performed). In addition, production and evaluation of the test pattern are performed at the same level as those of Examples 7 to 12 and Comparative Examples 7 to 12 described above except that the test is not performed by using the ink composition set but the test is individually performed by the ink compositions.

Herein, the following LED tack-free property is evaluation of the temporary curing (pinning) performed by using the LED. On the other hand, the accumulated energy listed in the Tables is the energy of the light illumination during the main curing performed by using a metal halide lamp, and it does not include the energy of the pinning (temporary curing) performed by the LED. In addition, the illumination apparatus used for the main curing is UVAPRINT 300HPLK (trade name) manufactured by Honle.

1. LED Tack-Free Property

The evaluation is performed similarly to the evaluation of the LED tack-free property performed in Examples 7 to 12 and Comparative Examples 7 to 12 described above.

The evaluation standards are as follows.
2: equal to or more than 0 seconds and less than 30 seconds
1: equal to or more than 30 seconds and less than 60 seconds
0: equal to or more than 60 seconds 2. Color Stability The evaluation is performed similarly to the evaluation of the color stability performed in Examples 7 to 12 and Comparative Examples 7 to 12 described above.

The evaluation standards are as follows. Among the evaluation standards, the standards 1, 2, and 3 are practically allowable.
3: less than 1 hour
2: equal to or more than 1 hour and less than 2 hours
1: equal to or more than 2 hours and less than 24 hours
0: equal to or more than 24 hours 3. Transparency of Clear Ink The evaluation is performed similarly to the evaluation of the transparency of the clear ink performed in Examples 7 to 12 and Comparative Examples 7 to 12 described above.

The evaluation standards are as follows. Among the evaluation standards, the standards 1, 2, and 3 are practically allowable.
3: less than 2
2: equal to or more than 2 and less than 3
1: equal to or more than 3 and less than 4
0: equal to or more than 4 pigment has an absorption wavelength, the tack-free property becomes insufficient unlike the case of the clear ink. By comparing the contained amount of acylphosphine oxide-based photopolymerization initiator with Reference Example 9 where the contained amount is decreased down to 5 mass %, the effect of improving the curability may not be obtained. In addition, it can be understood from Reference Example 11 that, if the DETX-S (thioxanthone-based photopolymerization initiator) is contained with a predetermined amount, it is possible to secure the tack-free property. Since the thioxan-

TABLE 7

| | No. | | | | | |
|---|---|---|---|---|---|---|
| | Reference Example 1 | Reference Example 2 | Reference Example 3 | Reference Example 4 | Reference Example 5 | Reference Example 6 |
| Cyan Composition | Composition 1 | | | | | Composition 2 |
| Tack-free Property | 2 | 2 | 2 | 2 | 2 | 2 |
| Accumulated Energy (During Main Curing Period) | 100 mJ/cm$^2$ | 200 mJ/cm$^2$ | 400 mJ/cm$^2$ | 800 mJ/cm$^2$ | 1000 mJ/cm$^2$ | 200 mJ/cm$^2$ |
| Color Stability | 3 | 3 | 2 | 1 | 0 | 3 |

TABLE 8

| | No. | | | | | | | |
|---|---|---|---|---|---|---|---|---|
| | Reference Example 7 | Reference Example 8 | Reference Example 9 | Reference Example 10 | Reference Example 11 | Reference Example 12 | Reference Example 13 | Reference Example 14 |
| Cyan Composition | Composition 3 | Composition 4 | Composition 5 | Composition 6 | Composition 7 | Composition 8 | Composition 9 | Composition 10 |
| Tack-free Property | 1 | 2 | 0 | 0 | 2 | 0 | 2 | 0 |
| Accumulated Energy (During Main Curing Period) | 200 mJ/cm$^2$ | 200 mJ/cm$^2$ | 200 mJ/cm$^2$ | 200 mJ/cm$^2$ | 200 mJ/cm$^2$ | 200 mJ/cm$^2$ | 200 mJ/cm$^2$ | 200 mJ/cm$^2$ |
| Color Stability | 3 | 0 | 3 | 3 | 3 | 3 | 3 | 3 |

TABLE 9

| | No. | | | | | | | | |
|---|---|---|---|---|---|---|---|---|---|
| | Reference Example 15 | Reference Example 16 | Reference Example 17 | Reference Example 18 | Reference Example 19 | Reference Example 20 | Reference Example 21 | Reference Example 22 | Reference Example 23 |
| Clear Composition | Composition 1 | | | | | Composition 2 | Composition 3 | Composition 4 | Composition 5 |
| Tack-free Property | 2 | 2 | 2 | 2 | 2 | 1 | 2 | 2 | 0 |
| Accumulated Energy (During Main Curing Period) | 50 mJ/cm$^2$ | 100 mJ/cm$^2$ | 400 mJ/cm$^2$ | 800 mJ/cm$^2$ | 1000 mJ/cm$^2$ | 200 mJ/cm$^2$ | 200 mJ/cm$^2$ | 200 mJ/cm$^2$ | 200 mJ/cm$^2$ |
| Transparency | 0 | 1 | 1 | 3 | 3 | 2 | 1 | 0 | 2 |

The following results may be understood from Tables 7, 8, and 9 listed above. It can be understood from Reference Example 9 that, in the case where both of the thioxanthone-based photopolymerization initiator and the 1, 3-α amino alkyl phenone-based photopolymerization initiator are not contained, the tack-free property deteriorates. In addition, it can be understood that, in the case where the contained amount of acylphosphine oxide-based photopolymerization initiator is less than that of Reference Example 23 by 4 mass %, the tack-free property deteriorates (in addition, the tack-free property of Reference Example 20 where the contained amount is 6 mass % is good).

It can be understood from Reference Example 10 that, although the acylphosphine oxide-based photopolymerization initiator is added with a maximum amount (12 mass %) which is allowable with respect to the clear ink, since the cyan thone-based photopolymerization initiator has a large light absorption amount at the short wavelength side in comparison with the acylphosphine oxide-based photopolymerization initiator and the absorption wavelength of the thioxanthone-based photopolymerization initiator overlaps the absorption wavelength of the pigment is shorter than that of the acylphosphine oxide-based photopolymerization initiator, it is possible to secure the tack-free state. In addition, it can be understood from Reference Example 12 that, in the case where the cyan ink does not contain the acylphosphine oxide-based photopolymerization initiator, the curability deteriorates, and it is difficult to obtain a good curability by using only the thioxanthone-based photopolymerization initiator. In addition, it can be understood from Reference Example 13 that the 1,3-α amino alkyl phenone-based photopolymerization initiator also has the same result as that of the thioxanthone-based photopolymerization initiator.

In addition, the following results are recognized or expected. It is recognized that, if the contained amount of acylphosphine oxide-based photopolymerization initiator in the cyan ink is in a range of 2 to 10 mass %, the preferable results are obtained. More specifically, in the Reference Examples where the contained amount is within this range, the results of evaluation are good. On the other hand, it is expected from Reference Example 12 that, if the contained amount is less than 2 mass %, the tack-free property deteriorates. It is recognized from Reference Example 11 that, with respect to the upper limit of the contained amount, up to 10 mass % may be added. In addition, if the contained amount is more than 10 mass %, it is expected from the result of evaluation of the transparency of the clear ink that yellowish discolorization may occur. However, since the coloring (yellowish discolorization) of the cyan ink is not conspicuous unlike the clear ink, it is not clear whether or not the contained amount more than 10 mass % is within a practically allowable range. However, although the contained amount is 10 mass %, it can be understood from the result of Reference Example 10 that, if the photopolymerization initiator is only the acylphosphine oxide-based photopolymerization initiator, the curability deteriorates. Therefore, although the contained amount is 11 mass %, the photopolymerization initiator may not be practically allowable. In addition, if the contained amount of acylphosphine oxide-based photopolymerization initiator is further increased, the problem of yellowish discolorization may become more serious, so that the test is not performed with respect to the contained amount of more than 10 mass %.

It may be understood from the results of Examples, Comparative Examples, and Reference Examples described hereinbefore that the results of the evaluation of the color stability of the cyan ink and the results of the evaluation of the transparency of the clear ink are independent of each other, so that the results do not influence each other. Therefore, without limitation to the Examples or Comparative Examples described above, if the accumulated energy amount is within a predetermined range, a desired ink set may be produced by appropriately combining Reference Examples 1 to 14 relating to the cyan ink and Reference Examples 15 to 23 relating to the clear ink.

Examples 12 to 20 and Comparative Examples 13 to 19

The evaluation 4 by the ink set is performed. The ink compositions and the evaluation items are as follows. The results are listed in the following Tables 10 and 11.

Ink Composition

The ink compositions except for the cyan ink composition 11 and the cyan ink composition 12 are the same as the ink compositions described above, and the cyan ink composition 11 and the cyan ink composition 12 are newly produced.

The cyan ink composition 11: the cyan ink composition 11 is produced under the same conditions as those of the cyan ink composition 1 except that 3% of isopropyl thioxanthone (manufactured by Nippon Kayaku Co., Ltd., a mixture of 2-isopropyl thioxanthone and 4-isopropyl thioxanthone) is used instead of using 3 mass % of the DETX-S. The cyan ink composition 12: the cyan ink composition 12 is produced under the same conditions as those of the cyan ink composition 1 except that 4 mass % of the DETX-S is used instead of using 3 mass % thereof and 54.9 mass % of the tri propylene glycol diacrylate is used instead of using 55.9 mass % thereof.

1. Evaluation of the Image Quality Relating to Color Stability

The evaluation is performed by the same method as that of the image quality evaluation relating to the color stability of the evaluation 1 described above.

2. Evaluation of Image Quality Relating to Bleeding

The evaluation is performed by the same method as that of the image quality evaluation relating to the bleeding of the evaluation 1 described above.

3. Evaluation of Image Quality Relating to Adhesiveness

The test pattern is obtained by the same method as that of the image quality evaluation relating to the color stability of the evaluation 1 described above.

With respect to the positions where the beta pattern by the cyan ink and the beta pattern by the clear ink are formed to overlap each other in the obtained test pattern, the evaluation of adhesiveness is performed by the following method.

The evaluation of the adhesiveness of the film and the cured film is performed in accordance with JIS K5600-5-6 (General Paint Testing Method-Part 5: Mechanical Properties of coated film-Section 6: Adhesiveness (Cross-Cut Method)). In addition, classifications of the evaluation standards are as follows.

A: A cut edge is completely smooth, and there is no peeling in any cell of the lattice.
B: Small peeling is recognized at a cut intersection of a coated film.
C: Peeling occurs along the cut edge and/or at the cut intersection of the coated film.
D: Peeling occurs partially or entirely along the cut edge of the coated film, and/or peeling occurs partially or entirely at various portions of the cell.

Example 17

In Example 17, when the test pattern for the image quality evaluation described above is produced, the first temporary curing illumination unit 42e and the second temporary curing illumination unit 42f of the ink jet printer 1 are turned OFF; the temporary curing of the beta pattern by the cyan ink and the beta pattern by the clear ink is not performed; and the main curing by the main curing light source is performed.

Comparative Example 20

Comparative Example 20 has the same configuration as that of Example 13 except that, in the ink jet printer 1, the cyan ink head of the transport direction upstream side is charged with the clear ink, the clear ink head of the downstream side is charged with the cyan ink, first the clear ink is ejected on the recording medium to form the clear pattern, and the cyan pattern is formed on a portion of the clear pattern.

TABLE 10

| | Example 12 | Example 13 | Example 14 | Example 15 | Example 16 | Example 17 (Main Curing: No) | Example 18 | Example 19 |
|---|---|---|---|---|---|---|---|---|
| Accumulated Energy (During Main Curing Period) | 400 mJ/cm$^2$ | 200 mJ/cm$^2$ | 400 mJ/cm$^2$ | 400 mJ/cm$^2$ | 400 mJ/cm$^2$ | 400 mJ/cm$^2$ | 400 mJ/cm$^2$ | 800 mJ/cm$^2$ |

TABLE 10-continued

| | Example 12 | Example 13 | Example 14 | Example 15 | Example 16 | Example 17 (Main Curing: No) | Example 18 | Example 19 |
|---|---|---|---|---|---|---|---|---|
| Cyan Composition | Composition 1 | Composition 1 | Composition 2 | Composition 3 | Composition 11 | Composition 1 | Composition 12 | Composition 12 |
| Clear Composition | Composition 1 | Composition 1 | Composition 1 | Composition 1 | Composition 1 | Composition 1 | Composition 1 | Composition 1 |
| Evaluation of Image Quality (Color Stability) | 2 | 3 | 2 | 2 | 2 | 2 | 2 | 1 |
| Evaluation of Image Quality (Bleeding) | A | A | A | A | A | B | A | A |
| Evaluation of Image Quality (Adhesiveness) | A | B | C | B | B | A | A | A |

TABLE 11

| | Example 20 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|
| Accumulated Energy (During Main Curing Period) | 100 mJ/cm$^2$ | 400 mJ/cm$^2$ | 400 mJ/cm$^2$ | 400 mJ/cm$^2$ | 50 mJ/cm$^2$ | 400 mJ/cm$^2$ | 200 mJ/cm$^2$ | 200 mJ/cm$^2$ | 200 mJ/cm$^2$ |
| Cyan Composition | Composition 1 | Composition 5 | Composition 6 | Composition 10 | Composition 1 | Composition 1 | Composition 5 | Composition 1 | Composition 1 |
| Clear Composition | Composition 1 | Composition 1 | Composition 1 | Composition 1 | Composition 1 | Composition 5 | Composition 2 | Composition 5 | Composition 1 |
| Evaluation of Image Quality (Color Stability) | 3 | 3 | 3 | 3 | 3 | 2 | 3 | 2 | 3 |
| Evaluation of Image Quality (Bleeding) | A | B | B | B | A | B | B | B | A |
| Evaluation of Image Quality (Adhesiveness) | C | D | D | D | D | D | D | D | D |

It is recognized from Tables 10 and 11 listed above that, in all the Examples, the evaluation of the image quality relating to the color stability and the evaluation of the image quality relating to the adhesiveness are good. In addition, in Example 17 where the temporary curing of the cyan ink composition and the clear ink composition is not performed, although the evaluation of the image quality relating to the bleeding is the evaluation of B, the evaluation of the image quality relating to the color stability and the evaluation of the image quality relating to the adhesiveness are equivalent to the evaluations of the examples where the temporary curing is performed. In addition, in Example 17, the test pattern is generated by the same method as that of "4. Evaluation of transparency of Clear Ink" of the evaluation 2 described above, the evaluation of the transparency of the clear ink is the evaluation 1. On the other hand, in any one of the Comparative Examples, the evaluation of the image quality relating to the adhesiveness deteriorates. In addition, although Comparative Example 18 has the same configuration as that of the above-described Comparative Example 8 and Comparative Example 19 has the same configuration as that of the above-described Comparative Example 11, the evaluation of the image quality relating to the adhesiveness deteriorates. In Comparative Example 20, the adhesiveness deteriorates.

Examples 21 to 29 and Comparative Examples 21 to 28

The evaluation 5 by the ink set is performed. The ink compositions and the evaluation items are as follows. The contents and results are listed in the following Tables 12 to 14.

Ink Composition

The cyan ink compositions (compositions 13 to 17) and the clear ink compositions (compositions 6 to 10) are produced at the same level as that of the ink compositions used for the above-described evaluations except that the compositions are replaced with the compositions listed in Tables 12 and 13.

Constituents Used acrylic acid 2-(2-vinyloxy ethoxyethyl)ethyl (manufactured by Nippon Shokubai Co., Ltd., expressed by VEEA in the tables)

phenoxy ethyl acrylate (manufactured by Osaka Organic Chemical Co., expressed by PEA in the tables)

dicyclopentenyl acrylate (FA-511AS, manufactured by Hitachi Chemical Co., Ltd., expressed by FA511 in the tables)

Image Quality Evaluation Method

The image quality evaluations are performed by the same methods as those of the evaluations described above.

Recording Method

In Examples 21 to 27 and Comparative Examples 21 to 26 of evaluation 5, the image quality evaluation pattern is produced under the same conditions of evaluation 1 except that the main curing illumination unit 44 in the ink jet printer (ink jet printer 1) of FIG. 2 used for the above-described evaluation 1 is replaced with the LED (peak wavelength: 395 nm, illumination intensity: 1000 mW/cm$^2$) (in an ink jet printer 2) and the conditions listed as follows are used. On the other hand, in Examples 28 to 29 and Comparative Examples 27 and 28, the image quality evaluation pattern is produced by using an ink jet printer 3 which is a serial printer illustrated in FIG. 4.

Figure 4:
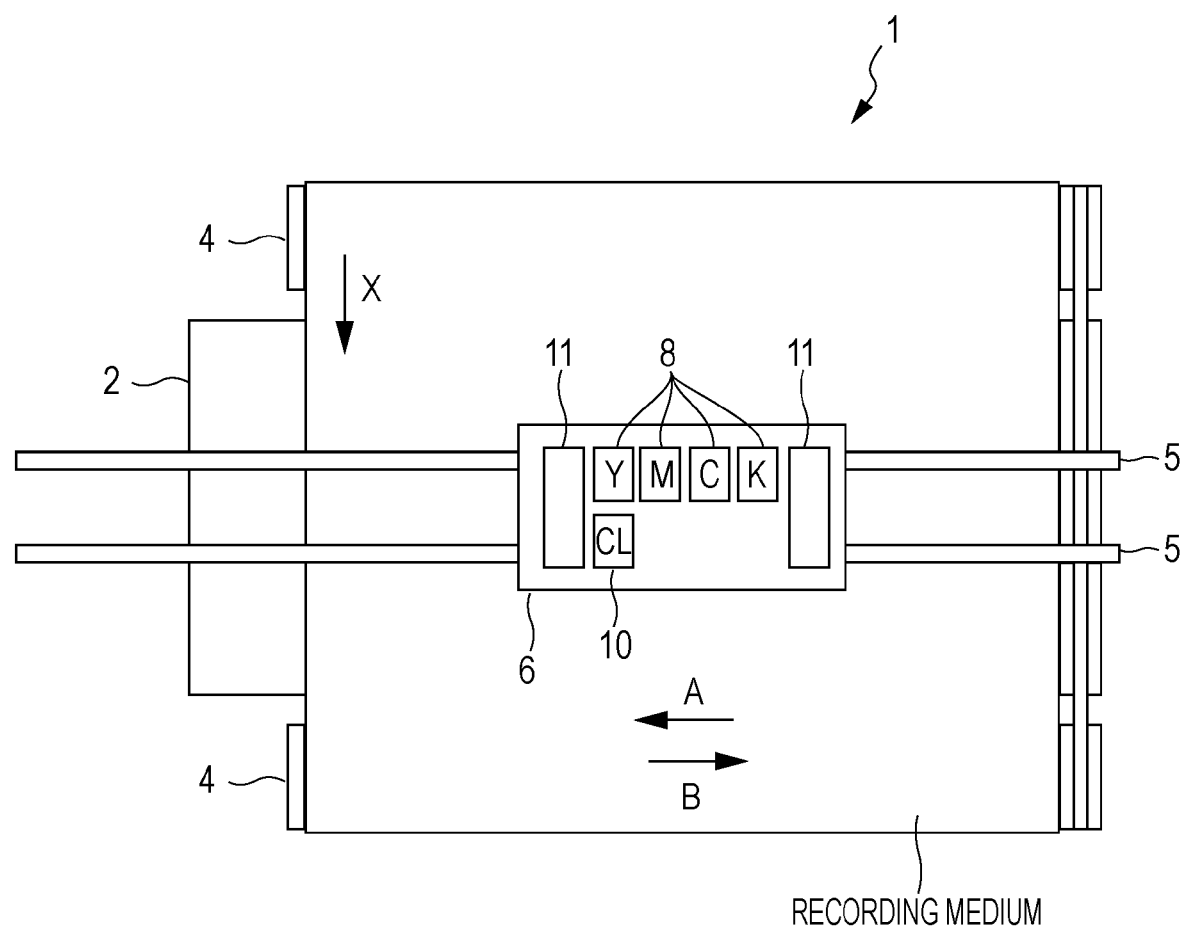
FIG. 4 is a schematic diagram illustrating a portion of a configuration of a serial printer which is an embodiment of the invention.

The ink jet printer 3 has a configuration illustrated in FIG. 4 with respect to a peripheral portion of a carriage including a head or an illumination unit or a recording medium transport mechanism and the overall configuration thereof is the same as that of the ink jet printer 1 except for the components described above.

In FIG. 4, reference numeral 6 denotes a carriage; reference numeral 8 denotes each of color ink heads including a cyan ink head; reference numeral 10 denotes a clear ink head; reference numeral 11 denotes illumination units; reference numeral 5 denotes a guide rail; reference numeral 2 denotes a platen; reference numeral 4 denotes a transport roller; reference numerals A and B denote the main scan direction; and reference numeral X denotes a sub scan direction. The ink from the ink head is ejected on the recording medium of the ink through the main scanning of the carriage in the main scan direction (any one of the A direction and the B direction), and among the two illumination units 11, the illumination unit at the rear side from the ink head in the main scan direction performs illumination on the ink attached on the recording medium. The main scanning and the sub scanning (transportation of the recording medium) are alternately performed, so that the main scan direction is changed between the A direction and the B direction every main scanning.

In the color ink heads 8 and the clear ink head 10, the sub scan direction lengths (distance H) of the nozzle columns used for ejection of one ink are the same. In the case where the one time sub scan direction distance (distance S) is equal to the distance H, a serial one pass recording method is performed so that the recording is performed by the one time main scanning (pass) of the one ink. In the case where the distance S is shorter than the distance H, a serial multi-pass recording method is performed so that the recording is performed by two or more times of the main scanning (pass) of the one ink. In the case where the serial multi-pass recording method is performed, as the distance S is decreased, the number of passes is increased, so that the number of passes may be configured to be two or more. In the case where the serial multi-pass recording method is performed, after illumination is performed one time at the first pass by the one illumination unit 11, illumination is performed two times on the ink ejected on the recording medium at the first pass by the two illumination units 11 in the pass after the second pass and in the one pass. Each of the illumination units 11 is performed by using the LED (peak wavelength: 395 nm, illumination intensity: 1000 mW/cm$^2$), and in the illumination units 11, only the portions (the portions of which the positions in the sub scan direction are coincident) which are aligned with the color ink heads 8 or the clear ink head 10 in the main scan direction emit the UV to illuminate the recording medium. The details of the ink jet printer 3 may be referred to in, for example, JPA-2006-289722.

Examples 21 to 25 and Comparative Examples 21 to 24: similarly to evaluation 1, the recording method is performed where the scanning (pass) is only performed one time on the recording medium with respect to the printer head by a line printer (line one pass). The cyan pattern is produced by curing the ink through the illumination of the first temporary curing (illumination energy 10 mJ/cm$^2$) by the first temporary curing illumination unit 44e, after that, the second temporary curing (illumination energy 10 mJ/cm$^2$) by the second temporary curing illumination unit 44f, and after that, the main curing (illumination energy 200 mJ/cm$^2$) by the main curing illumination unit, that is, the illumination of a total of 220 mJ/cm$^2$. The clear pattern is produced by curing the ink through the illumination of the second temporary curing (illumination energy 10 mJ/cm$^2$) by the second temporary curing illumination unit 44f and, after that, the main curing (illumination energy 200 mJ/cm$^2$) by the main curing illumination unit, that is, the illumination of a total of 210 mJ/cm$^2$. The illumination energy of the temporary curing illumination unit and the illumination energy of the main curing illumination unit are controlled by adjusting the illumination continuation time of the illumination from each illumination unit performed on the recording medium.

Examples 26 and 27 and Comparative Examples 25 and 26: the image quality evaluation pattern is produced in the same method as that of Example 21 except that the illumination energy of the main curing is replaced with the illumination energy listed in the Tables.

Example 28: the serial printer (ink jet printer 3) is used; the formation of the cyan pattern is completed by the two passes of the cyan ink head disposed in the upstream direction of the sub scan direction of the recording medium among the ink heads; and in the cyan pattern, there are dots attached on the recording medium by the first pass scanning and the dots attached on the recording medium by the second pass scanning. Subsequently, the clear pattern is formed to overlap a portion of the cyan pattern by the two passes of the clear ink head disposed in the downstream direction of the sub scan direction of the recording medium among the print heads. In the clear pattern, there are dots attached on the recording medium by the first pass scanning and the dots attached on the recording medium by the second pass scanning. The illumination continuation time of the one time main scanning is adjusted so that the illumination energy of the one time illumination by the illumination unit 11 becomes 100 mJ/cm$^2$.

The cyan pattern includes (A) the cyan dots which are attached on the recording medium at the first pass of the cyan ink head, which are illuminated one time by the one illumination unit 11 in the pass where the dots are attached thereto, and after that, which are illuminated six times by the two illumination units 11 in the three passes by the two passes of the clear head at the second pass of the cyan head, so that a total of 100×7=700 mJ/cm$^2$ is illuminated, and (B) the cyan dots which are attached at the second pass of the cyan head, which are illuminated one time by the one illumination unit 11 in the pass where the dots are attached thereto, and after that, which are illuminated four times by the two illumination units 11 in the two passes of the clear head, so that a total of 100×5=500 mJ/cm$^2$ is illuminated. In addition, the clear pattern includes (A) the clear dots which are attached on the recording medium at the first pass of the clear ink head, which are illuminated one time by the illumination unit 11 in the pass where the dots are attached thereto, and after that, which are illuminated two times by the illumination unit 11 at the second pass of the clear head, so that a total of 100×3=300 mJ/cm$^2$ is illuminated, and (B) the cyan dots which are attached at the second pass of the clear ink head and which are illuminated one time by the illumination unit 11 in the pass where the dots are attached thereto, so that 100×1=100 mJ/cm$^2$ is illuminated.

Example 29: the illumination continuation time of the one time main scanning is adjusted so that the energy of the one time illumination performed on the recording medium by each of the illumination units of the serial printer (ink jet printer 3) becomes 200 mJ/cm$^2$. The formation of the cyan pattern is completed by the one pass of the cyan ink head disposed in the upstream direction of the sub scan direction of the recording medium among the ink heads; and in the cyan pattern, there are dots attached on the recording medium by the one pass scanning. Subsequently, the clear pattern is formed to overlap a portion of the cyan pattern by the one pass of the clear head disposed in the downstream direction of the sub scan direction of the recording medium among the printer heads. In the clear pattern, there are dots attached on the recording medium by the one pass scanning. The illumination energy for the cyan dots is 200+200 mJ/cm², and the illumination energy for the clear dots is 200 mJ/cm².

Comparative Example 27: the illumination continuation time of the one time main scanning is adjusted so that the energy of the one time illumination performed on the recording medium by each of the illumination units of the serial printer (ink jet printer 3) becomes 50 mJ/cm². The formation of the cyan pattern is completed by the two passes of the cyan ink head disposed in the upstream direction of the sub scan direction of the recording medium among the ink heads. In the cyan pattern, there are dots attached on the recording medium by the first pass scanning and the dots attached on the recording medium by the second pass scanning. Subsequently, the clear pattern is formed to overlap a portion of the cyan pattern by the one pass of the clear ink head disposed in the downstream direction of the sub scan direction of the recording medium among the print heads. In the clear pattern, there are dots attached on the recording medium by the first pass scanning and the dots attached on the recording medium by the second pass scanning. In the cyan pattern, there are cyan dots having the illumination energy of 50×1+50×4 mJ/cm² and the cyan dots having the illumination energy of 50×3+50×4 mJ/cm². In the clear pattern, there are cyan dots having the illumination energy of 50×1 mJ/cm² and the cyan dots having the illumination energy of 50×3 mJ/cm².

Comparative Example 28: the illumination continuation time of the one time main scanning is adjusted so that the energy of the one time illumination performed on the recording medium by each of the illumination units of the serial printer (ink jet printer 3) becomes 150 mJ/cm². The formation of the cyan pattern is completed by the two passes of the cyan ink head disposed in the upstream direction of the sub scan direction of the recording medium among the ink heads. In the cyan pattern, there are dots attached on the recording medium by the first pass scanning and the dots attached on the recording medium by the second pass scanning. Subsequently, the clear pattern is formed to overlap a portion of the cyan pattern by the one pass of the clear ink head disposed in the downstream direction of the sub scan direction of the recording medium among the print heads. In the clear pattern, there are dots attached on the recording medium by the first pass scanning and the dots attached on the recording medium by the second pass scanning. In the cyan pattern, there are cyan dots having the illumination energy of 150×1+150×4 mJ/cm² and the cyan dots having the illumination energy of 150×3+150×4 mJ/cm². In the clear pattern, there are cyan dots having the illumination energy of 150×1 mJ/cm² and the cyan dots having the illumination energy of 150×3 mJ/cm².

TABLE 12

| | | Light Curable Type Cyan Ink Composition | | | | |
|---|---|---|---|---|---|---|
| | | Composition 13 | Composition 14 | Composition 15 | Composition 16 | Composition 17 |
| Pigment | GLO | 3.0 | 3.0 | 3.0 | 3.0 | 3.0 |
| Dispersing Agent | 36000 | 0.2 | 0.2 | 0.2 | 0.2 | 0.2 |
| Photopolymerization | DETX-S | 4.0 | 0.5 | 6.0 | 0.1 | |
| Initiator | 369 | | | | | 4.0 |
| | 819 | 5.0 | 5.0 | 5.0 | 5.0 | 5.0 |
| | TPO | 4.0 | 4.0 | 4.0 | 4.0 | 4.0 |
| Polymerizable | VEEA | 21.7 | 25.2 | 19.7 | 25.6 | 21.7 |
| Compound | PEA | 35.0 | 35.0 | 35.0 | 35.0 | 35.0 |
| | FA511 | 5.0 | 5.0 | 5.0 | 5.0 | 5.0 |
| | TPGDA | 20.0 | 20.0 | 20.0 | 20.0 | 20.0 |
| Polymerization Inhibitor | UV-22 | 1.6 | 1.6 | 1.6 | 1.6 | 1.6 |
| Surfactant | UV3500 | 0.5 | 0.5 | 0.5 | 0.5 | 0.5 |
| Total Sum | | 100.0 | 100.0 | 100.0 | 100.0 | 100.0 |

TABLE 13

| | | Light Curable Type Clear Ink Composition | | | | |
|---|---|---|---|---|---|---|
| | | Composition 6 | Composition 7 | Composition 8 | Composition 9 | Composition 10 |
| Pigment | GLO | | | | | |
| Dispersing Agent | 36000 | | | | | |
| Photopolymerization | DETX-S | | | | | |
| Initiator | 369 | | | | | |
| | 819 | 3.0 | 7.0 | 4.5 | 7.0 | 2.0 |
| | TPO | 2.0 | 5.0 | 2.5 | 7.0 | 2.0 |
| Polymerizable | VEEA | 32.9 | 25.9 | 30.9 | 23.9 | 33.9 |
| Compound | PEA | 35.0 | 35.0 | 35.0 | 35.0 | 35.0 |
| | FA511 | 5.0 | 5.0 | 5.0 | 5.0 | 5.0 |
| | TPGDA | 20.0 | 20.0 | 20.0 | 20.0 | 20.0 |
| Polymerization Inhibitor | UV-22 | 1.6 | 1.6 | 1.6 | 1.6 | 1.6 |
| Surfactant | UV3500 | 0.5 | 0.5 | 0.5 | 0.5 | 0.5 |
| Total Sum | | 100.0 | 100.0 | 100.0 | 100.0 | 100.0 |

TABLE 14

|  | Example 21 | Example 22 | Example 23 | Example 24 | Example 25 | Example 26 | Example 27 | Example 28 | Example 29 |
|---|---|---|---|---|---|---|---|---|---|
| Cyan Composition | Composition 13 | Composition 14 | Composition 17 | Composition 13 | Composition 13 | Composition 13 | Composition 13 | Composition 13 | Composition 13 |
| Clear Composition | Composition 8 | Composition 8 | Composition 8 | Composition 6 | Composition 7 | Composition 8 | Composition 8 | Composition 8 | Composition 8 |
| Ink Jet Printer | 2 | 2 | 2 | 2 | 2 | 2 | 2 | 3 | 3 |
| Recording Method | Line 1 Pass | Line 1 Pass | Line 1 Pass | Line 1 Pass | Line 1 Pass | Line 1 Pass | Line 1 Pass | Serial 2 Pass | Serial 1 Pass |
| Accumulated Energy (Cyan Composition) | 10 + 10 + 200 mJ/cm² | 10 + 10 + 200 mJ/cm² | 10 + 10 + 200 mJ/cm² | 10 + 10 + 200 mJ/cm² | 10 + 10 + 200 mJ/cm² | 10 + 10 + 90 mJ/cm² | 10 + 10 + 780 mJ/cm² | 100 × (1-3) + 100 × 4 mJ/cm² | 200 × 1 + 200 × 1 mJ/cm² |
| Accumulated Energy (Clear Composition) | 10 + 200 mJ/cm² | 10 + 200 mJ/cm² | 10 + 200 mJ/cm² | 10 + 200 mJ/cm² | 10 + 200 mJ/cm² | 10 + 90 mJ/cm² | 10 + 780 mJ/cm² | 100 × (1-3) mJ/cm² | 200 × 1 mJ/cm² |
| Evaluation of Image Quality (Color stability) | 2 | 3 | 2 | 2 | 2 | 3 | 1 | 1 | 2 |
| Evaluation of Image Quality (Transparency) | 1 | 1 | 1 | 2 | 1 | 1 | 3 | 1 | 1 |
| Evaluation of Image Quality (Bleeding) | A | A | A | A | A | A | B | A | A |
| Evaluation of Image Quality (Adhesiveness) | B | B | C | B | B | C | A | C | B |

|  | Comparative Example 21 | Comparative Example 22 | Comparative Example 23 | Comparative Example 24 | Comparative Example 25 | Comparative Example 26 | Comparative Example 27 | Comparative Example 28 |
|---|---|---|---|---|---|---|---|---|
| Cyan Composition | Composition 15 | Composition 16 | Composition 13 | Composition 13 | Composition 13 | Composition 13 | Composition 13 | Composition 13 |
| Clear Composition | Composition 8 | Composition 8 | Composition 9 | Composition 10 | Composition 8 | Composition 8 | Composition 8 | Composition 8 |
| Ink Jet Printer | 2 | 2 | 2 | 2 | 2 | 2 | 3 | 3 |
| Recording Method | Line 1 Pass | Line 1 Pass | Line 1 Pass | Line 1 Pass | Line 1 Pass | Line 1 Pass | Serial 2 Pass | Serial 2 Pass |
| Accumulated Energy (Cyan Composition) | 10 + 10 + 200 mJ/cm² | 10 + 10 + 200 mJ/cm² | 10 + 10 + 200 mJ/cm² | 10 + 10 + 200 mJ/cm² | 10 + 10 + 50 mJ/cm² | 10 + 10 + 900 mJ/cm² | 50 × (1-3) + 50 × 4 mJ/cm² | 150 × (1-3) + 150 × 4 mJ/cm² |
| Accumulated Energy (Clear Composition) | 10 + 200 mJ/cm² | 10 + 200 mJ/cm² | 10 + 200 mJ/cm² | 10 + 200 mJ/cm² | 10 + 50 mJ/cm² | 10 + 900 mJ/cm² | 50 × (1-3) mJ/cm² | 150 × (1-3) mJ/cm² |
| Evaluation of Image Quality (Color Stability) | 0 | 3 | 2 | 2 | 2 | 0 | 2 | 0 |
| Evaluation of Image Quality (Transparency) | 1 | 1 | 0 | 3 | 0 | 3 | 0 | 1 |
| Evaluation of Image Quality (Bleeding) | A | B | A | A | A | A | A | A |
| Evaluation of Image Quality (Adhesiveness) | A | D | A | D | D | A | D | B |

Referring to Tables 13 and 14 listed above, in all the Examples, the results of the evaluation of the image quality are good, and on the country, in Comparative Examples, at least one of the results of the image quality deteriorates. It may be understood from the results that, in the case where the ink set including the cyan ink composition containing the acylphosphine oxide-based photopolymerization initiator and at least one of the thioxanthone-based photopolymerization initiator and/or the a amino alkyl phenone-based photopolymerization initiator which is in a range of 0.5 to 4 mass % and the clear ink composition containing the acylphosphine oxide-based photopolymerization initiator which is in a range of 5 to 12 mass % is used and the illumination energy at the time when a coated film made from the ink set is cured through light illumination from a light source is in a range of 100 to 800 mJ/cm², the evaluation of the image quality becomes excellent and, particularly, the transparency and the color stability are compatible with each other. In the evaluation 5, it may be understood that, in the case where the illumination units for performing the illumination are the same type of light source and several times of the illumination are performed, if a total of the illumination energy is within this range described above, good results may be obtained. In addition, it may be understood that the illumination energy for the cyan ink and the illumination energy for the clear ink may not be equal to each other, but if each illumination energy is within a predetermined range, good results may be obtained.

In addition, in the case of using a serial printer, the following results may be obtained. In the serial printer, since the illumination may be configured to be performed in the main scanning after the main scanning where the ink is ejected, although the illumination energy of the one time illumination is small, a total of the illumination energy may be increased by the illumination by the following main scanning. In addition, although not shown in FIG. 4, at least one end of the illumination unit 11 is configured to extend to the sub scan direction downstream side from the clear ink head, and the extension portion is also allowed to emit light. Therefore, after the main scanning for printing by the clear ink head, the illumination may be performed by the extension portion of the illumination unit. In this case, if a total of the illumination energy including the illumination by the extension portion of the illumination unit is within this range described above, good results may also be obtained. This case is preferable in that, while the serial ink jet printer is used, a difference between the illumination energy for the cyan ink and the illumination energy for the clear ink may be reduced and in that, in the case where the illumination energy for the clear ink is insufficient, the illumination energy may be compensated for by the illumination from the extension portion.

The entire disclosure of Japanese Patent Application No.: 2010-260936, filed Nov. 24, 2010 and 2011-204287, filed Sep. 20, 2011 are expressly incorporated by reference herein.

What is claimed is:

1. A recording method using a light curable type ink set including a light curable type color ink composition containing a polymerizable compound, a photopolymerization initiator, and a coloring material and a light curable type clear ink composition containing a polymerizable compound and a photopolymerization initiator, wherein the light curable type color ink composition contains (1) an acylphosphine oxide-based photopolymerization initiator and (2) at least one of a thioxanthone-based photopolymerization initiator and/or an α amino alkyl phenone-based photopolymerization initiator which is in a range of 0.5 to 4 mass % with respect to the total mass of the color ink composition, wherein the light curable type clear ink composition contains an acylphosphine oxide-based photopolymerization initiator which is in a range of 5 to 12 mass % with respect to the total mass of the clear ink composition, wherein illumination energy at the time when a coated film made from the ink set is cured through light illumination from a light source is in a range of 100 to 800 mJ/cm$^2$, and wherein a first coated film of the light curable type color ink composition is formed on the recording medium, and a second coated film of the light curable type clear ink composition is formed on the first coated film.

2. The recording method according to claim 1, wherein the light curable type color ink composition contains a thioxanthone-based photopolymerization initiator which is in a range of 0.5 to 4 mass % with respect to the total mass of the color ink composition.

3. A light curable type ink set including the light curable type color ink composition and the light curable type clear ink composition used in the recording method according to claim 2.

4. The recording method according to claim 1, wherein the light source is a mercury lamp or a metal halide lamp.

5. A light curable type ink set including the light curable type color ink composition and the light curable type clear ink composition used in the recording method according to claim 4.

6. The recording method according to claim 1, wherein the light curable type clear ink composition is illuminated with the light from a temporary curing light source before the light illumination of the illumination energy from the light source.

7. The recording method according to claim 6, wherein the temporary curing light source is a light-emitting diode.

8. A light curable type ink set including the light curable type color ink composition and the light curable type clear ink composition used in the recording method according to claim 6.

9. The recording method according to claim 1, wherein while the recording medium is relatively scanned with respect to a print head, the light curable type ink set is ejected from the print head and landed on the recording medium to form the coated film, and the coated film is cured through the light illumination, so that the image is formed, wherein the recording method includes:

forming the first coated film on the recording medium by allowing a light curable type color ink composition to be ejected and landed on the recording medium;

performing temporary curing of the first coated film by first light illumination;

forming the second coated film on some or all of the first coated film by allowing a light curable type clear ink composition to be ejected on some or all of the first coated film;

performing temporary curing of the second coated film by second light illumination; and performing main curing of the temporarily-cured first and second coated films by light illumination from a light source.

10. The recording method according to claim 9, wherein a conversion ratio in the performing of the temporary curing of the first coated film by the first light illumination is in a range of 30 to 95%.

11. The recording method according to claim 9, wherein a conversion ratio in the performing of the temporary curing of the second coated film by the second light illumination is in a range of 30 to 100%.

12. The recording method according to claim 9, wherein the second light illumination has a much shorter wavelength than the first light illumination.

13. The recording method according to claim 1, wherein the light source is a light-emitting diode.

14. The recording method according to claim 1, wherein recording is performed by using a line ink jet printer.

15. The recording method according to claim 1, wherein recording is performed by using a serial ink jet printer.

16. The recording method according to claim 15, wherein illumination by main scanning and illumination by main scanning after the main scanning are performed on the ink attached on the recording medium by the main scanning.

17. The recording method according to claim 15, wherein illumination energy for a cyan ink composition and illumination energy for a clear ink composition are different from each other.

18. A light curable type ink set including the light curable type color ink composition and the light curable type clear ink composition used in the recording method according to claim 1.

19. A recording apparatus performing recording by using the recording method according to claim 1.

20. The recording method according to claim 1, wherein the illumination energy from the light source fully cures the coated film, and wherein, prior to the full curing, the coated film is temporarily cured through light illumination from a second light source providing a different energy than the light source.

* * * * *